United States Patent [19]
Flamme

[11] Patent Number: 6,024,035
[45] Date of Patent: Feb. 15, 2000

[54] SEED PLANTING RATE MAINTENANCE CONTROL WITH RATE DISPLAY

[75] Inventor: David D. Flamme, Hinsdale, Ill.

[73] Assignee: Case Corporation, Racine, Wis.

[21] Appl. No.: 08/935,759

[22] Filed: Sep. 23, 1997

[51] Int. Cl.$^7$ ...................................................... A01C 7/00
[52] U.S. Cl. .......................... 111/178; 111/181; 111/904; 250/222.2; 222/624; 221/13
[58] Field of Search .................... 111/178, 181, 111/188, 179, 900, 903, 904, 200, 17, 19, 118; 701/50; 390/674; 250/222.2; 221/13, 2; 222/614, 624, 626

[56] References Cited

U.S. PATENT DOCUMENTS

| | | |
|---|---|---|
| 3,762,603 | 10/1973 | Bauman et al. . |
| 3,848,552 | 11/1974 | Bauman et al. . |
| 3,860,146 | 1/1975 | Bauman et al. . |
| 3,885,704 | 5/1975 | Lienemann et al. . |
| 4,013,875 | 3/1977 | McGlynn . |
| 4,148,414 | 4/1979 | Parks, Jr. . |
| 4,296,409 | 10/1981 | Whitaker et al. . |
| 4,333,096 | 6/1982 | Jenkins et al. . |
| 4,365,672 | 12/1982 | Robinson, Jr. et al. . |
| 4,381,036 | 4/1983 | Fardal et al. . |
| 4,413,685 | 11/1983 | Gremelspacher et al. . |
| 4,467,872 | 8/1984 | Hodapp . |
| 4,488,476 | 12/1984 | Diel et al. . |
| 4,523,280 | 6/1985 | Bachman . |
| 4,530,463 | 7/1985 | Hiniker et al. . |
| 4,653,410 | 3/1987 | Typpi . |
| 4,721,168 | 1/1988 | Kinzenbaw . |
| 4,747,301 | 5/1988 | Bellanger . |
| 4,803,626 | 2/1989 | Bachman et al. . |
| 5,025,951 | 6/1991 | Hook et al. . |
| 5,220,876 | 6/1993 | Monson et al. . |
| 5,232,054 | 8/1993 | Van Blaricon et al. . |
| 5,260,875 | 11/1993 | Tofte et al. . |
| 5,323,721 | 6/1994 | Tofte et al. .............................. 111/200 |
| 5,336,882 | 8/1994 | Fooks et al. .............................. 250/221 |
| 5,347,117 | 9/1994 | Fooks et al. .............................. 250/221 |

(List continued on next page.)

FOREIGN PATENT DOCUMENTS

| 197801 | 1/1978 | U.S.S.R. ............................... 111/903 |
|---|---|---|

OTHER PUBLICATIONS

Operators Manual, 955 Planter Cyclo Air Dec. 1923 Solid Row Crop Front Fold, Rac 9–29280, Case Corporation, Dec. 1996, 14 excerpts.

Drills 5400 and 5500 Soybean Special Pamphlet, No. AE 174086, Case Corporation, 1996, 1 page.

Early Riser 955 Series Cyclo Air Planters Pamphlet, No. AE 17086, Case Corporation, 1996, 1 page.

Early Riser Cyclo Air and Plate Planters, RC Cultivators and Hoes Pamphlet, No. AE 101055, Case Corporation, 1995, 2 pages.

*Primary Examiner*—Victor Batson
*Attorney, Agent, or Firm*—Foley & Lardner

[57] ABSTRACT

A seed planter performance monitor is disclosed herein. The monitor is used with a planting system including a planter coupled to the tractor. The target rate at which the planter deposits seeds into the soil being planted is controlled with a control signal, and the actual rate at which seeds are planted is monitored with an infrared seed sensor supported by the planter at the location where seeds exit the planter. The planter and tractor both include data busses, and the signal from the seed sensor is transmitted to a controller on the tractor via the busses. The controller applies an appropriate signal to an electronic display in the cab of the tractor to produce an image thereon which an operator can view to determine the actual rate at which seeds are planted. The operator compares the target and the actual planting rates, and adjusts or controls the planter to place the rates in general correspondence by varying planter parameters such as air flow or pressure in the planter, or brush spacing in the drum of the seed meter.

25 Claims, 20 Drawing Sheets

U.S. PATENT DOCUMENTS

| | | |
|---|---|---|
| 5,424,957 | 6/1995 | Kerkhoff et al. . |
| 5,431,117 | 7/1995 | Steffens et al. . |
| 5,488,817 | 2/1996 | Paquet et al. . |
| 5,498,929 | 3/1996 | Formwalt, Jr. . |
| 5,574,657 | 11/1996 | Tofte et al. . |
| 5,581,235 | 12/1996 | Hollstein . |
| 5,598,794 | 2/1997 | Harms et al. . |
| 5,605,105 | 2/1997 | Clark et al. ................ 111/903 X |
| 5,621,666 | 4/1997 | O'Neall et al. . |
| 5,635,911 | 6/1997 | Landers et al. . |
| 5,646,846 | 7/1997 | Bruce et al. ................ 111/903 X |
| 5,673,637 | 10/1997 | Colburn, Jr. et al. ........ 111/903 X |

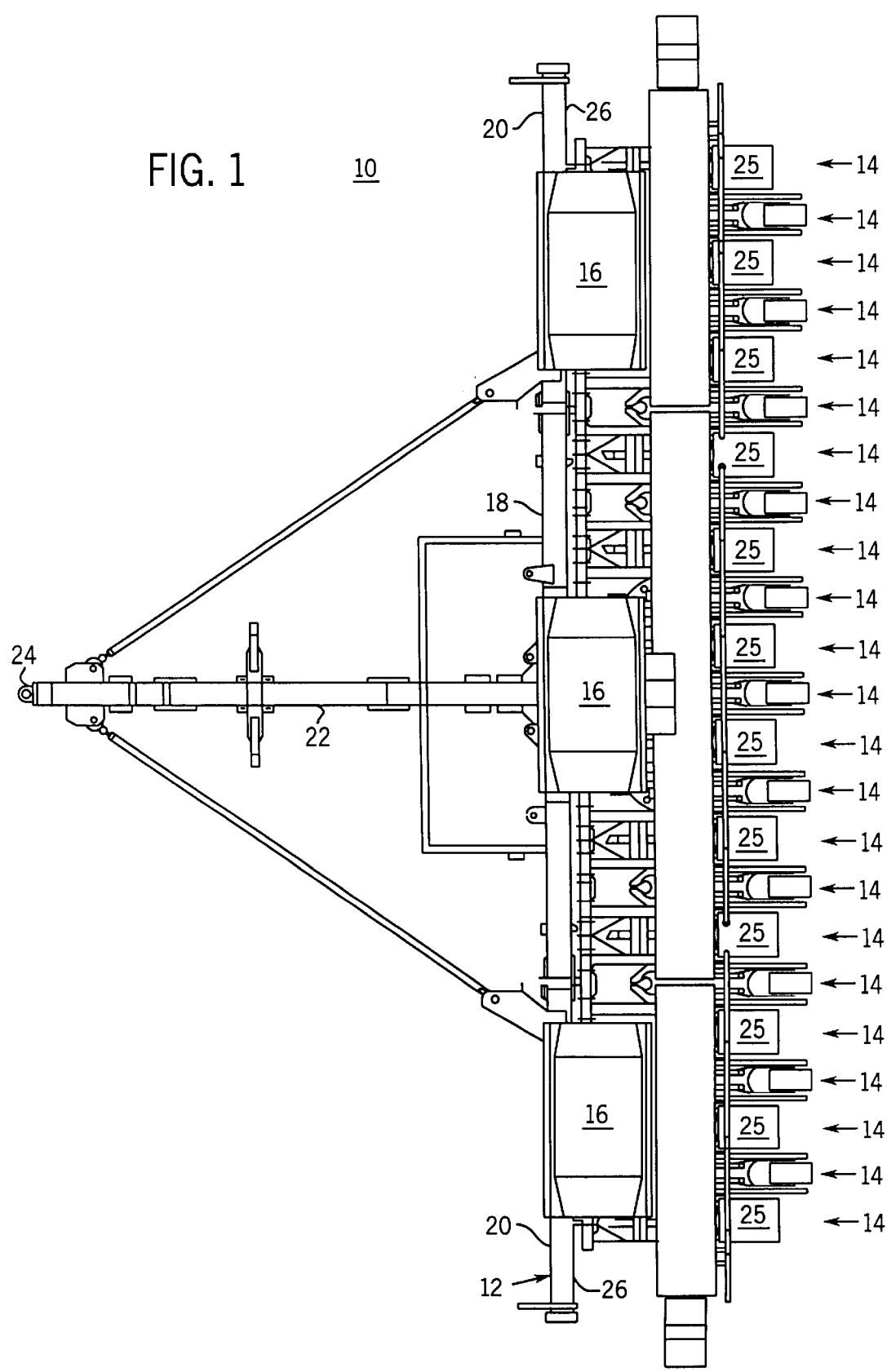

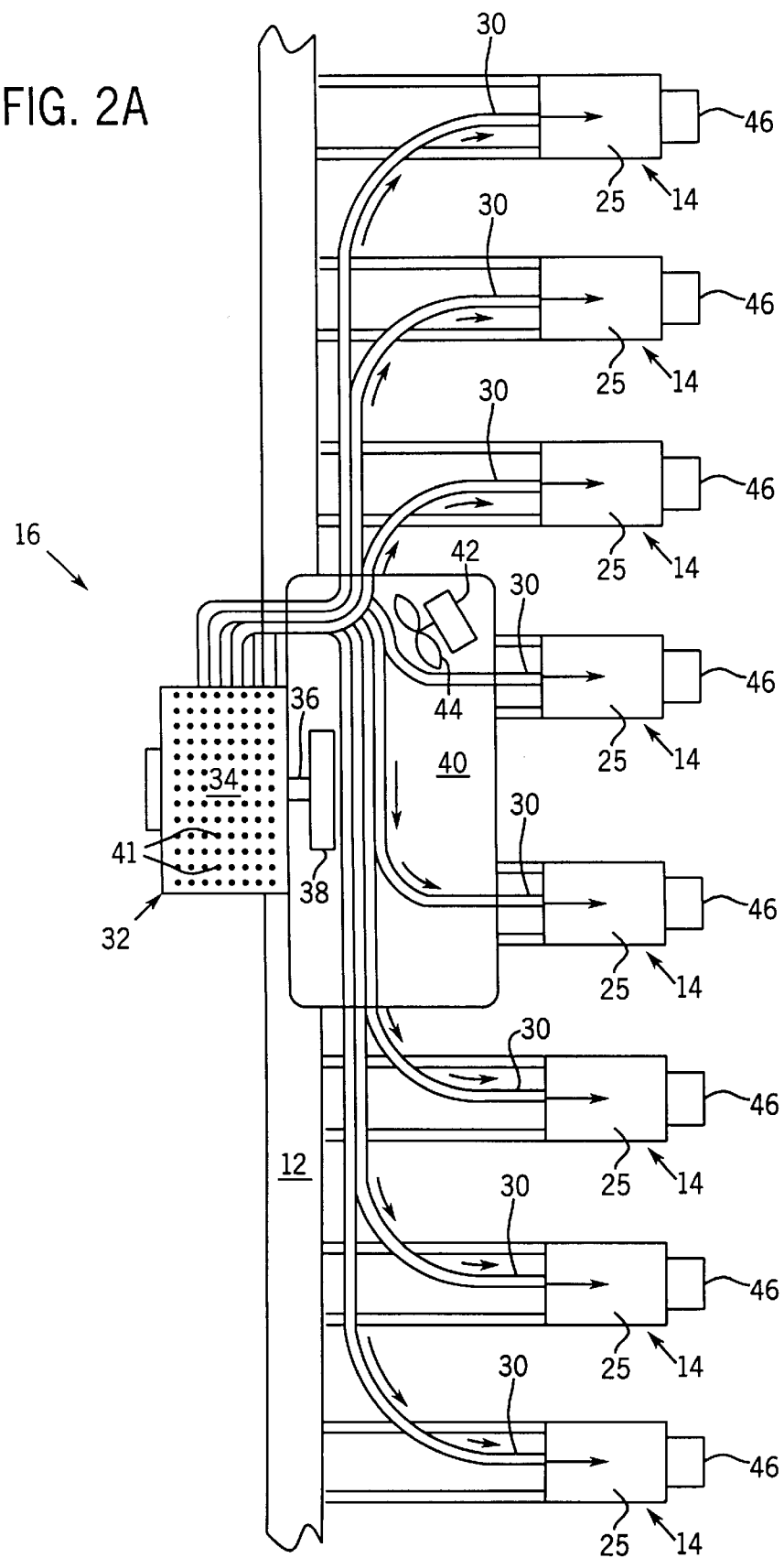

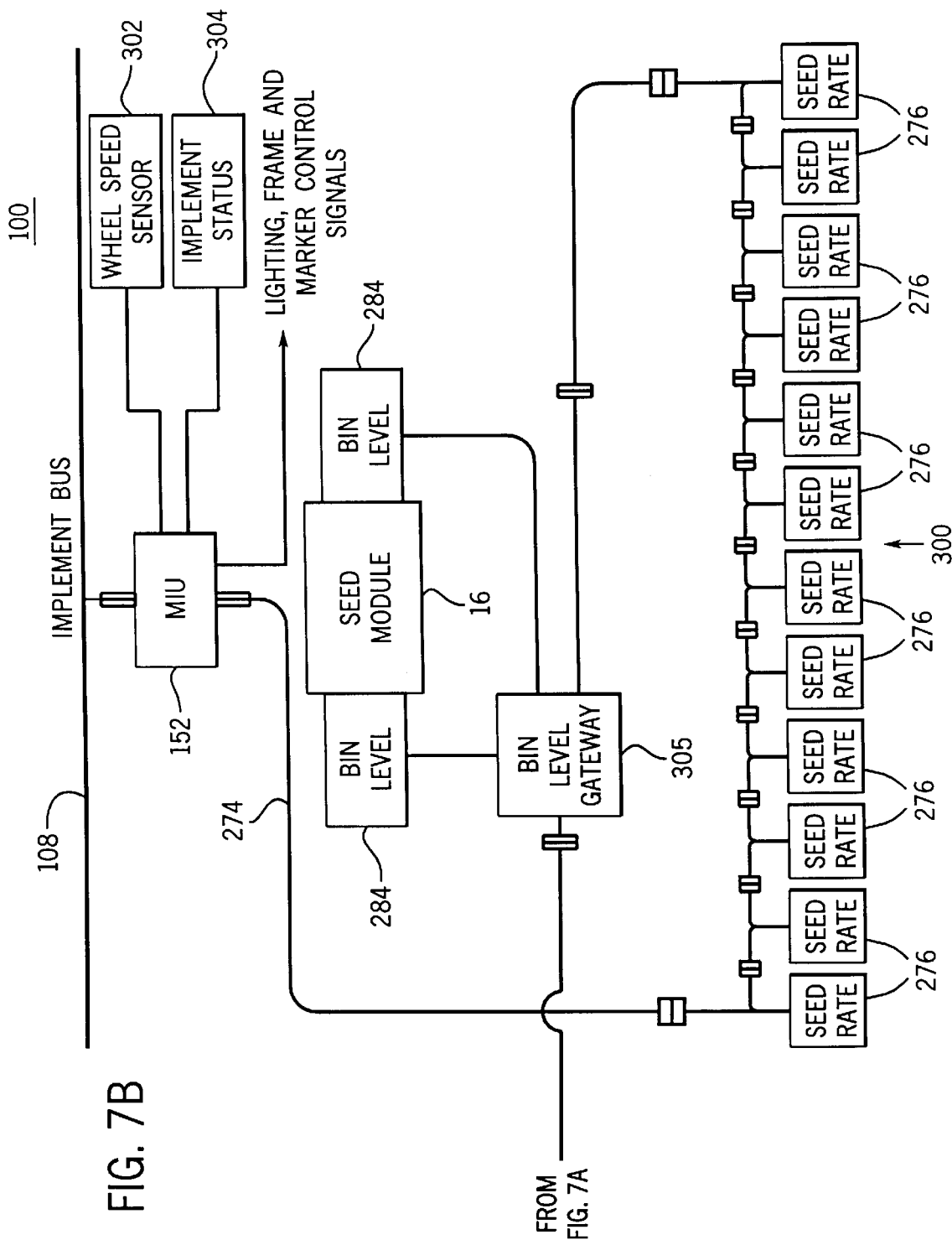

SEED PLANTING RATE MAINTENANCE CONTROL WITH RATE DISPLAY

FIELD OF THE INVENTION

The invention generally relates to controlling the planting rate of a seed meter of an agricultural planter. In particular, the invention relates to maintaining the planting rate of the seed meter by displaying the actual seed delivery rate and adjusting an operating parameter of the planter until the displayed delivery rate comes into correspondence with a target seed delivery rate.

BACKGROUND OF THE INVENTION

Planting implements such as planters and drills are used for planting seeds in agricultural fields. Planters and drills include a frame having one or more sections. Each section supports multiple row units configured to apply seeds to a field as the implement is pulled across the field by an agricultural vehicle (e.g., a wheeled or tracked tractor). The seeds are stored in a seed bin mounted on or pulled behind the implement. Planting implements often include systems for applying granular or liquid fertilizer, insecticide or herbicide to the field.

Planters include seed meters configured to dispense or meter individual seeds to row units for application to the soil. In contrast, drills use fluted rolls to meter a mass or volume of seed. The metering and placement accuracy is typically higher for planters than drills. Seeds of crop (e.g., corn) requiring relatively accurate metering and placement for efficient growth are typically planted using planters, and seeds of crop which grow efficiently in more varied environments (e.g., oats; wheat) are planted by less accurate and expensive drills.

Many types of planters and drills are made by Case Corp., the assignee of this invention. For example, the 955 Series EARLY RISER CYCLO AIR® Planters have central-fill seed bins for storing seed, pressurized air metering systems including cyclo seed meters for metering seed, and air distribution systems for delivering metered seed to row units. Planters in this series plant different numbers of rows at different row widths. For example, a 12/23 Solid Row Crop (SRC) Cyclo Planter plants 23 narrow rows or 12 wide rows when every other row unit is locked up. Drills made by Case Corp. include the 5300, 5400, 5500, 7100 and 7200 drills which include different numbers of openers, opener spacings and seeding widths. For example, a 5500 Soybean Special Grain Drill includes 24 openers, 5 inch spacings and a 30 foot width.

Planting implements such as those described above may be equipped with variable-rate controllers permitting the operator to plant seed at target seed planting rates. Such implements may further be equipped with monitors, whether integral with or separate from the controllers, for displaying theoretical or estimated planting rates. An example of such a controller is available on the 955 Series Planters discussed above, and examples of such monitors are the Seed Flow II and Early Riser monitors sold by Case Corp. The seed planting rates are estimated because the above-described controllers and monitors do not include mechanisms or systems for counting the seeds actually planted. Rather, the rates are estimated based upon known and monitored parameters such as the meter constant (i.e., metered seeds per meter drum revolution), meter rotation speed, row width and distance traveled.

Depending on the condition and adjustments of the planting implement, estimated seed planting rates may deviate substantially from actual seed planting rates. For example, operator adjustments to 955 Series Planters which may cause errors between estimated and actual seed planting rates include: the pressure setting of the cyclo metering and distribution systems; the setting of a seed cutoff brush which removes seed from seed pockets in the drum; the height of a seed chute extension affecting the level of seed in the drum; and the height of a leveling bar ensuring the uniform distribution of seed across the bottom of the seed drum on hilly terrain. For drills, operator adjustments include the setting of a mechanical gate at the seed meter. The gate is a sliding panel that regulates the size of an opening at the base of the seed bin, and the gate setting selects the seed meter exposure (i.e., the amount of the meter in contact with the seed).

Planting implements have been adjusted based on the results of a calibration procedure wherein the seed meter is cranked a predetermined number of rotations while the dispensed seed is collected in a bag or container. The contents of the bag are manually weighed or counted to determine the amount of seed dispensed, and the planting implement is adjusted based upon the dispensed amount. The procedure is repeated until the correct adjustments are made. The need to repeat the calibration procedure multiple times is both time consuming and frustrating.

Accordingly, it would be desirable to provide a system for maintaining the planting rate of a planting implement based upon an actual or sensed seed count. It would be desirable to display maintenance seed planting rates in a format easily used to determine the difference between the actual seed planting rate and a target rate. It would also be desirable to allow an operator to make on-the-fly adjustments of seed planting parameters (e.g., air pressure, brush spacing, etc.) while displaying the effects of such adjustments to the operator in real-time. The display would indicate when the actual seed planting rate comes into general correspondence with a target seed planting rate. Such an improved maintenance system would eliminate the need to manually collect and then count the seed delivered during a predetermined interval, and would eliminate the need to repeatedly calibrate and re-adjust the implement until the actual seed planting rate comes close to the target rate. It would further be desirable to allow maintenance adjustments to be made while the planter remains still or to be made independent of speed.

SUMMARY OF THE INVENTION

One embodiment of the invention provides a seed planting system for planting seed in soil at desired rates. The system includes a tractor with an operator station (e.g., a cab), a seed planter including a seed channel having an exit through which a number of seeds move toward the soil, an electronic seed sensor attached to the planter to generate a seed signal representing the number of seeds, an electronic display supported at the operator station, and an operator-activated control at the operator station. A digital processing circuit monitors the seed signal, determines an actual seed delivery rate based upon the number of seeds and a time period during which the seed signal is monitored, and applies a display signal to the display to generate a first image on the display representative of the actual seed delivery rate. The processing circuit also modifies a parameter affecting the seed delivery rate in response to activation of the operator-activated control.

Another embodiment of the invention provides a seed planting monitoring system. The system is used with a planting arrangement having an operator station, a seed delivery system having a target seed delivery rate controlled by a control signal, and at least one seed channel having an exit through which a number of seeds move toward soil in which the seeds are planted. The system includes an electronic seed sensor attached to the seed delivery system which generates a seed signal representative of the number of seeds, an electronic display supported at the operator station, and an operator interface. A digital processing circuit monitors the seed signal, determines an actual seed delivery rate based upon the number of seeds and a time period during which the seed signal is monitored, applies a display signal to the display to generate an image representative of the actual seed delivery rate, and modifies a parameter affecting the seed delivery rate in response to activation of the operator interface.

A further embodiment of the invention provides a method for monitoring the operation of a seed planter from the cab of a tractor, wherein the seed planter is of the type including a seed delivery system having a target seed delivery rate controlled by a control signal, and at least one seed channel having an exit through which a number of seeds move toward soil in which the seeds are planted. The method includes generating a seed signal representative of the number of seeds, applying the control signal to the seed delivery system to control the target seed delivery rate, and monitoring the seed signal to determine an actual seed delivery rate based upon the number of seeds and a time period during which the seed signal is monitored. The method also includes generating a display signal representing the actual seed delivery rate, and applying the display signal to an electronic display located in the cab to generate an image on the display representative of the actual seed delivery rate.

Another embodiment of the invention provides a metering system for selectively applying material to the soil of a field. The system includes a tractor having a cab, and a material meter towed by the tractor and including at least one channel having an exit through which an amount of material moves toward the soil. An electronic sensor supported relative to the meter generates a material signal representative of the amount of material, and an electronic display supported within the cab. A digital processing circuit monitors the material signal, determines an actual material delivery rate based upon the amount of material and a time period during which the material signal is monitored, and applies a display signal to the display to generate an image representing the actual material delivery rate.

BRIEF DESCRIPTION OF THE DRAWINGS

The invention will become more fully understood from the following detailed description, taken in conjunction with the accompanying drawings, wherein like reference numerals refer to like parts, in which:

FIG. 1 is a top view of a planting implement such as a 12/23 SRC Cyclo Planter;

FIG. 2A is a schematic diagram illustrating a section of the planting implement of FIG. 1 which includes eight row units and a cyclo seed metering device configured to meter seed and deliver the metered seed to the row units;

FIGS. 7A–7B depict a block diagram of a control system useable with a drill planter which includes an MIU for monitoring seed rate sensors coupled to the row units;

DETAILED DESCRIPTION OF THE PREFERRED EMBODIMENTS

Figure 2B:
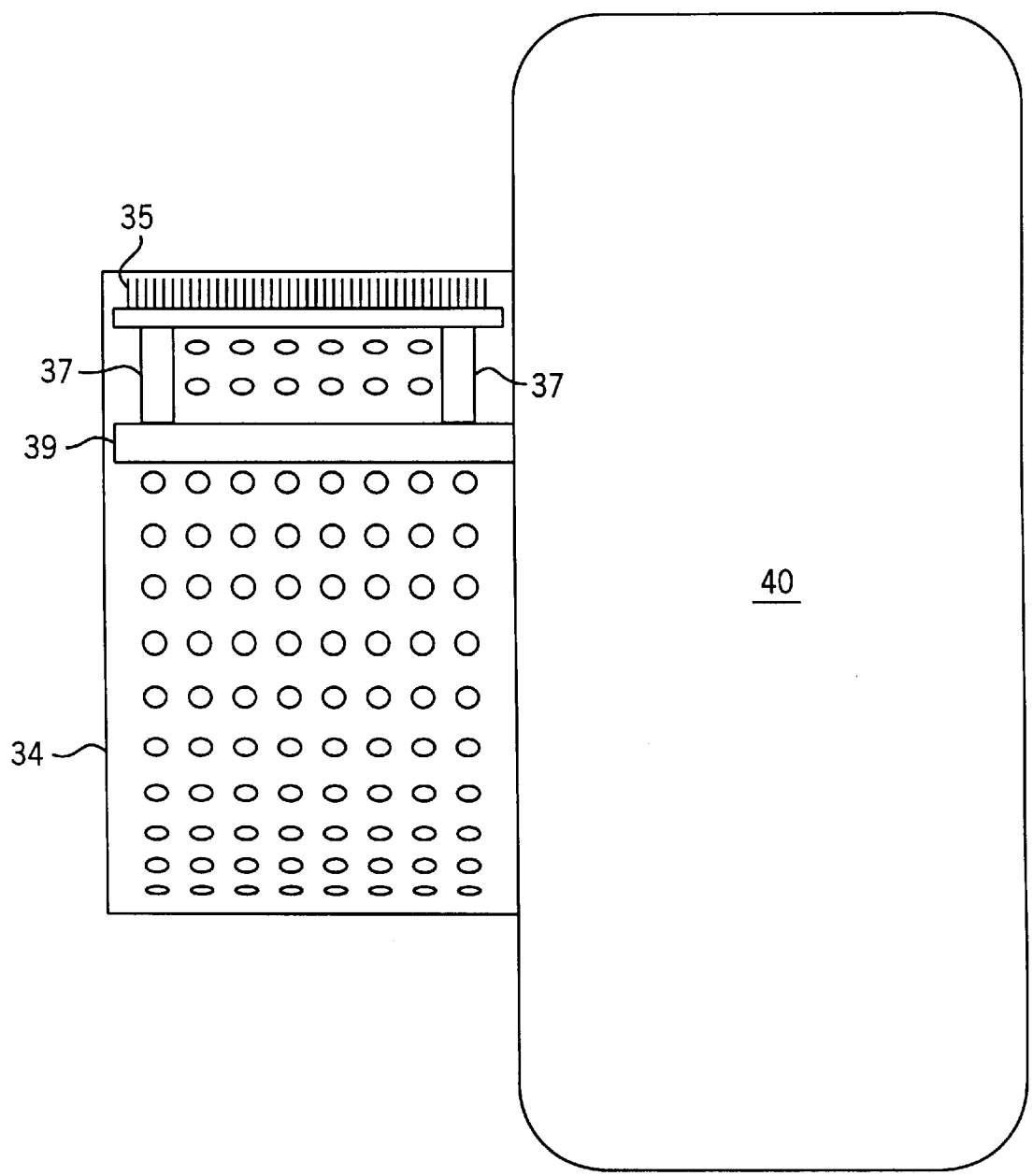
FIG. 2B is a schematic representation of an assembly for adjusting the orientation of the seed brush in the planter drum shown in FIG. 2A.

Referring to FIG. 1, a planting implement 10 (e.g., 12/23 SRC Cyclo Planter) includes a support structure such as a frame 12, row units 14 mounted beneath frame 12, and seed modules 16 supported on frame 12. Frame 12 includes a middle section 18, wing sections 20 on either side of section 18, and a drawbar 22 extending forward from section 18. Wing sections 20 rotate inwardly to drawbar 22 to decrease implement width during transport. A hitch having an eye 24 to drawbar 22 connect to an agricultural vehicle such as a tractor (102 in FIGS. 3A–3B). Twenty-three row units 14 are configured to plant seed in 23 rows of a field with all row units 14 down, or in 12 rows with every other row unit 14 locked up. Each module 16 meters seeds for row units 14 of one section. For example, the sections in FIG. 1 include 7, 8 and 8 row units 14, respectively, from left to right. Metered seeds are delivered through seed tubes (30 in FIG. 2A) from modules 16 to row units 14. Bins 25 storing other products (e.g., fertilizer, insecticide or herbicide), and metering devices therefore, are also supported by frame 12. Markers attached to either side 26 of frame 12 mark the centerline of the next pass through a field.

Referring to FIG. 2A, one section of implement 10 includes eight row units 14, a seed module 16 mounted on frame 12, and seed tubes 30 for moving seed from module 16 to row units 14. Seed module 16 includes a cyclo seed meter 32 for metering or singulating seed and to deliver the metered seed to row units 14. Cyclo seed meter 32 includes a perforated drum 34 secured by a shaft 36 to a hydraulic motor 38. The holes in drum 34 are arranged in circumferentially-spaced rows (e.g., 8 rows for an 8-row planter), with each row having a plurality of holes with diameters smaller than the seed being planted. The drum arrangement depends on the type of seed, and a line of interchangeable drums is made by Case Corp. A seed bin 40 stores the seed being planted. A hydraulic blower includes a hydraulic motor 42 and a fan 44 to provide pressurized air to bin 40 and to drum 34. Seeds move from bin 40 to drum 34 via a seed chute (not shown) with the aid of higher air pressure in bin 40 than drum 34.

During operation, blower 42–44 pressurizes drum 34 to create an air pressure differential above atmospheric, but lower than the air pressure in bin 40. As motor 38 rotates drum 34, the differential causes each hole to pick up one seed at the bottom of drum 34, and to retain the picked-up seeds against their respective holes 41 as drum 34 rotates. To increase the probability that one, and only one, seed is in a hole, a brush 35 sweeps the inside of drum 34. After further rotation moves the retained seeds above a manifold defined by openings of seed tubes 30 adjacent to drum 34, holes 41 are plugged by release wheels external to drum 34 to eliminate the forces which retain the seeds and cause the seeds to drop into tubes 30. The seeds are pushed by a cushion of pressurized air through seed tubes 30 to row units 14 to be planted. A press wheel 46 compresses the soil over the planted seed.

Referring to FIG. 2B, the pressure between brush 35 and drum 34 is adjustable. In particular, brush 35 is positioned against the interior of drum 34 with two positioners 37 attached at the inside of drum 34 to bin 40 by a support member 39. Positioners 37 are controlled by a multi-channel 154 (FIGS. 3A–3B), and may take the form of motor (D.C., stepping, etc.) driven screw positioners, electronically controlled, solenoid-operated hydraulic cylinders, etc. In operation, positioners 37 can adjust the pressure of brush 35 along its length by independently controlling the positioners. Alternatively, where control of the brush pressure along its length is not important, a single positioner 37 and appropriate brush support structure can be used.

Ideally, the seed application rates depend upon the rotation rate of drum 34. A variable application rate is obtained by controlling the rotation rate of drum 34 as a function of the ground speed (e.g., measured using implement wheel speed sensor 302 in FIGS. 6A–6C) and a commanded application rate. A valve assembly supplies pressurized hydraulic fluid to motor 38 to rotate shaft 36 at a variable rate in response to rate control signals applied to the valve assembly.

As discussed, seed application rates depend primarily on the rotational speed (rate) of drum 34. However, seed application rates also depend upon the air pressure in bin 40 and drum 34, and the pressure of brush 35 against the inside surface of drum 34. Accordingly, as discussed in further detail below, system 100 can be operated in a maintenance mode wherein drum 34 is rotated at a speed which should provide a desired seed flow rate (e.g., 40 rows of eight holes around the circumference of drum 34 should provide a seed rate of 40 seeds per revolution per seed tube 30). If the operator determines from the seed rate displayed on display 202 that the desired seed rate is not obtained in the maintenance mode then a parameter of the planter (e.g., drum air pressure or brush pressure) can be adjusted by the system operator.

Figure 3A:
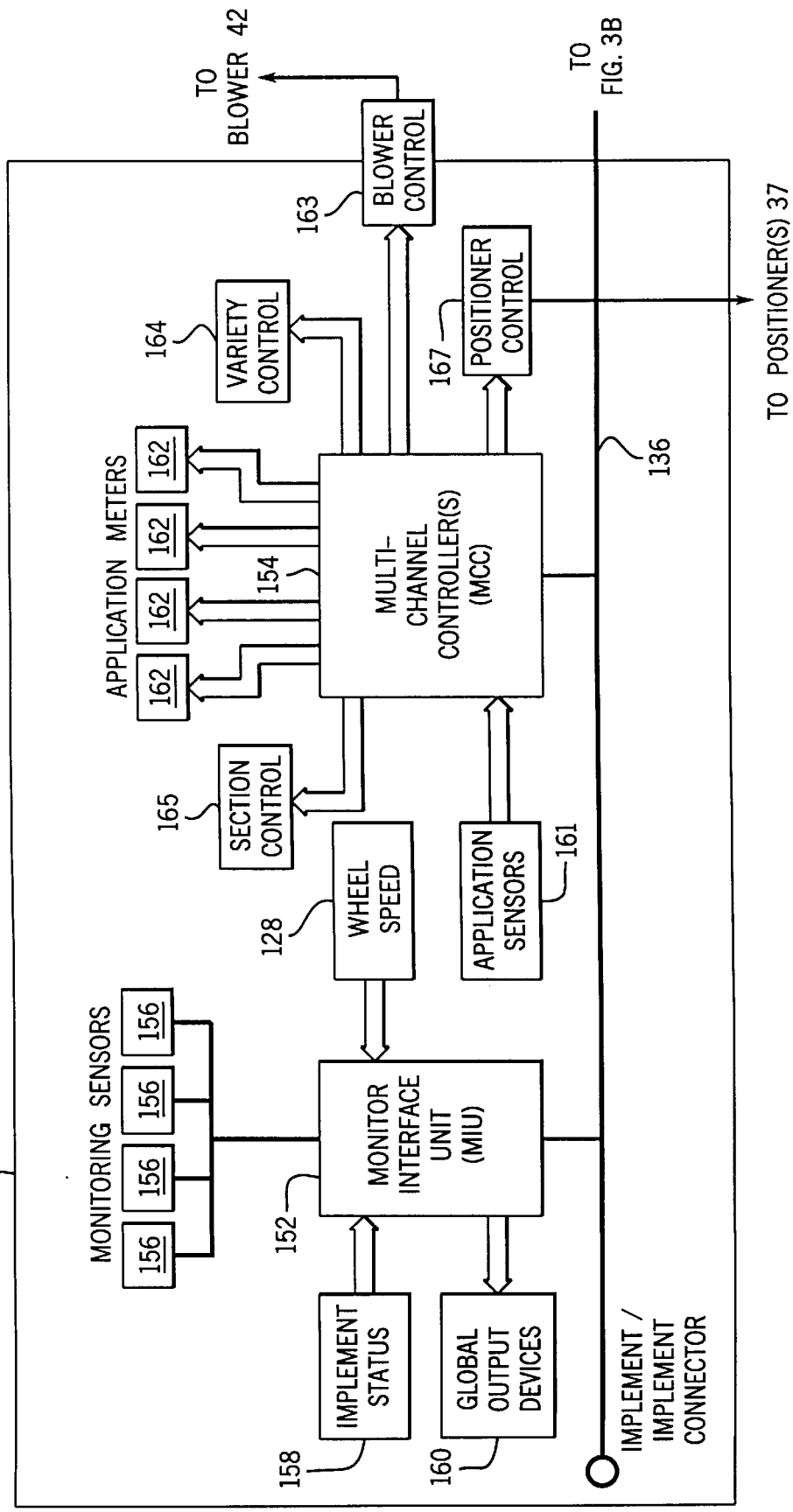
FIGS. 3A–3B depict a block diagram of the control system for an agricultural vehicle and the planting implement of FIG. 1 which includes vehicle and implement data busses.
Figure 3B:
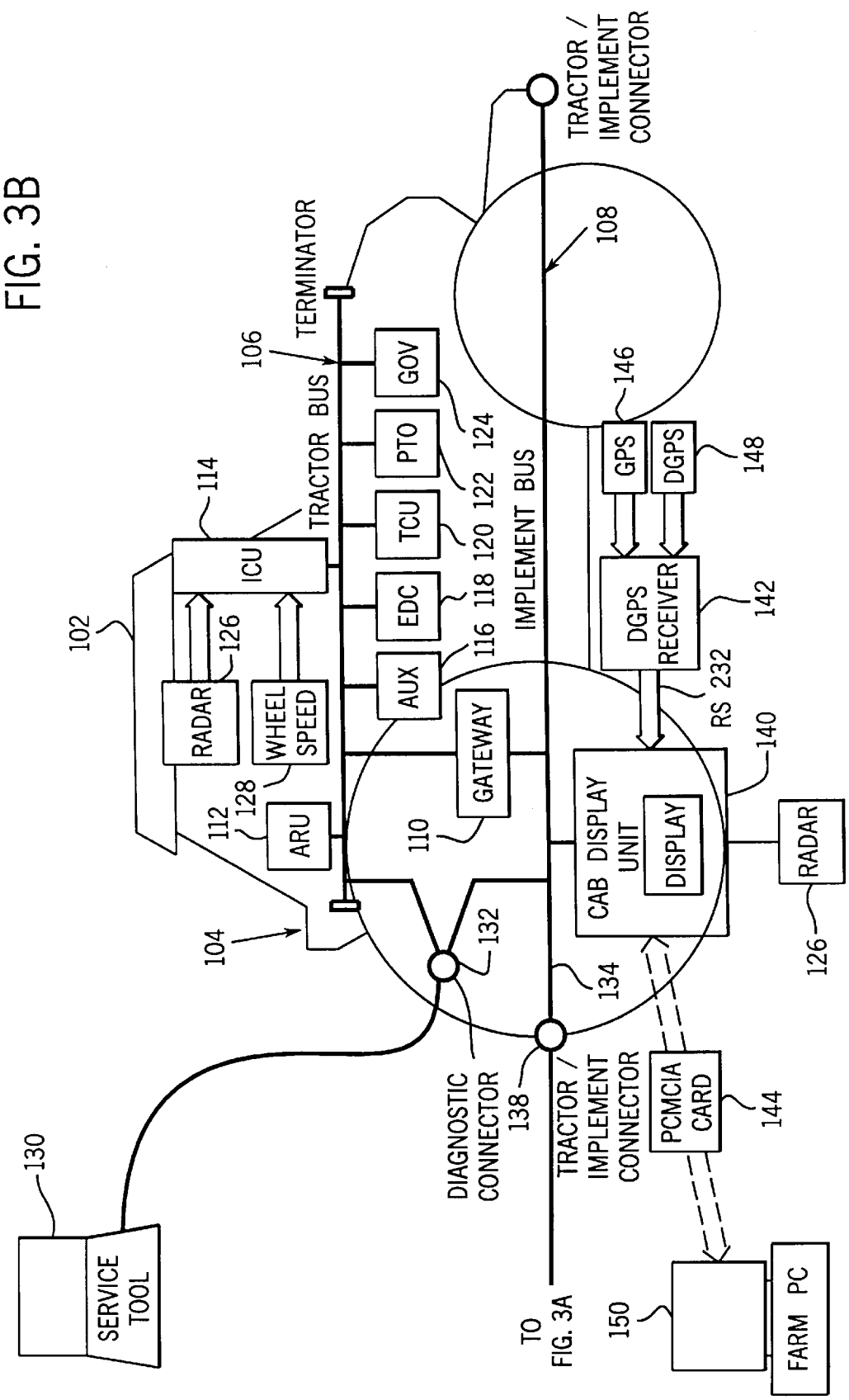

Referring to FIGS. 3A–3B, a control system 100 controls planting implement 10 (e.g., a planter or drill) as it is pulled across a field by vehicle 102. Control system 100 includes electronic control units (ECUs) in communication with each other across a vehicle data bus 104. Vehicle data bus 104 includes a tractor bus segment 106 to pass data throughout vehicle 102, and an implement bus segment 108 to communicate between vehicle 102 and implement 10. Bidirectional data passes between busses 106 and 108 via a network interconnection ECU 110 (e.g., a gateway). Bus 104 preferably conforms to the "Recommended Practice for a Serial Control and Communications Vehicle Network" (SAE J-1939) which uses Controller Area Network (CAN) protocol for low-layer communications. ECU 110 performs network functions as described in the Network Layer specification of J-1939 by acting as a repeater for forwarding messages between segments 106 and 108, a bridge for filtering out messages not needed by the receiving segment, a message router for remapping addresses and a gateway to repackage messages for increased efficiency. Other bus formats, however, may also be used and ECU 110 may perform all or only a subset of the above-listed network functions.

Other ECUs coupled to tractor bus 106 include an armrest control unit (ARU) 112, instrument cluster unit (ICU) 114, auxiliary valve control unit (AUX) 116, electronic draft control unit (EDC) 118, transmission control unit (TCU) 120, power take-off control unit (PTO) 122, and engine governor control unit (GOV) 124. ICU 114 receives signals from a true ground speed sensor 126 (e.g., a radar) mounted to the body of vehicle 102. Ground speed sensor 126 (e.g., a radar) may also be in direct communication with a cab-mounted display unit (CDU) 140. A service tool 130 can be coupled to busses 106 and 108 via a diagnostic connector 132 for use during diagnostics and maintenance.

The ECUs coupled to tractor bus 106 are illustrative and other control units such as a tractor performance monitor control unit or steering control unit could also be connected to bus 106. Further, the use of gateway 110 for communications between busses 106 and 108 allows a higher level of integration in tractors equipped with a tractor data bus. However, implement bus 108 and its associated ECUs may also be used to control implements pulled by other tractors which have no tractor data bus.

Implement bus 108 includes first and second segments 134 and 136 coupled via a connector 138 at the rear of vehicle 102. Segment 134 passes through vehicle 102 and segment 136 provides a communication pathway to implement 10. Thus, implement bus 108 reduces wiring needs between implement 10 and vehicle 102. Besides gateway ECU 110, ECUs coupled to segment 134 include cab-mounted display unit (CDU) 140. CDU 140 provides an operator interface, a serial interface (e.g., RS-232) to receive positioning signals from a DGPS receiver 142, and an interface for a memory card 144 (e.g., a PCMCIA card). Receiver 142 receives GPS and DGPS signals from antennas 146 and 148. Memory card 144 transfers geo-referenced map data (e.g., prescription and application rate maps defined by GIS or Global Information System databases) between control system 100 and an external computer 150. Prescription maps include application rate commands, and application rate maps record actual (i.e., sensed) application rates.

ECUs coupled to segment 136 of implement bus 108 are mounted to frame 12 of implement 10. These ECUs include a monitor interface unit (MIU) 152 and one or more multi-channel control units (MCCs) 154. Each implement section typically includes one "local" MCC 154 to control product application rates. MIU 152 monitors application rates of products (e.g., seeds) to rows and other parameters (e.g., bin level, ground speed, wheel speed, meter pressure) based on signals generated by monitoring sensors 156, implement status devices 158 and a wheel speed sensor 128 (e.g., inductance magnetic pickup sensor) coupled to the vehicle's wheels. MIU 152 also receives global commands from CDU 140 via bus 108, generates global control signals using the global commands, and applies the global control signals to global output devices 160 to perform global implement functions (e.g., lighting, frame, marker control). MCCs 154 receive commands from CDU 140 based on signals generated by application sensors 161, generate local control signals for local product metering devices 162, and apply the local control signals to metering devices 162. Further, MCCs 154 may generate control signals for a variety or type switch 164 which selects the variety or type of farming inputs applied, control signals for blower control 163 which powers blower 42, and control signals for positioner control 167 which controls the operation of positioners 37. MCCs 154 may also generate control signals for a section control switch 165 which selects which sections are enabled or disabled.

Figure 4:
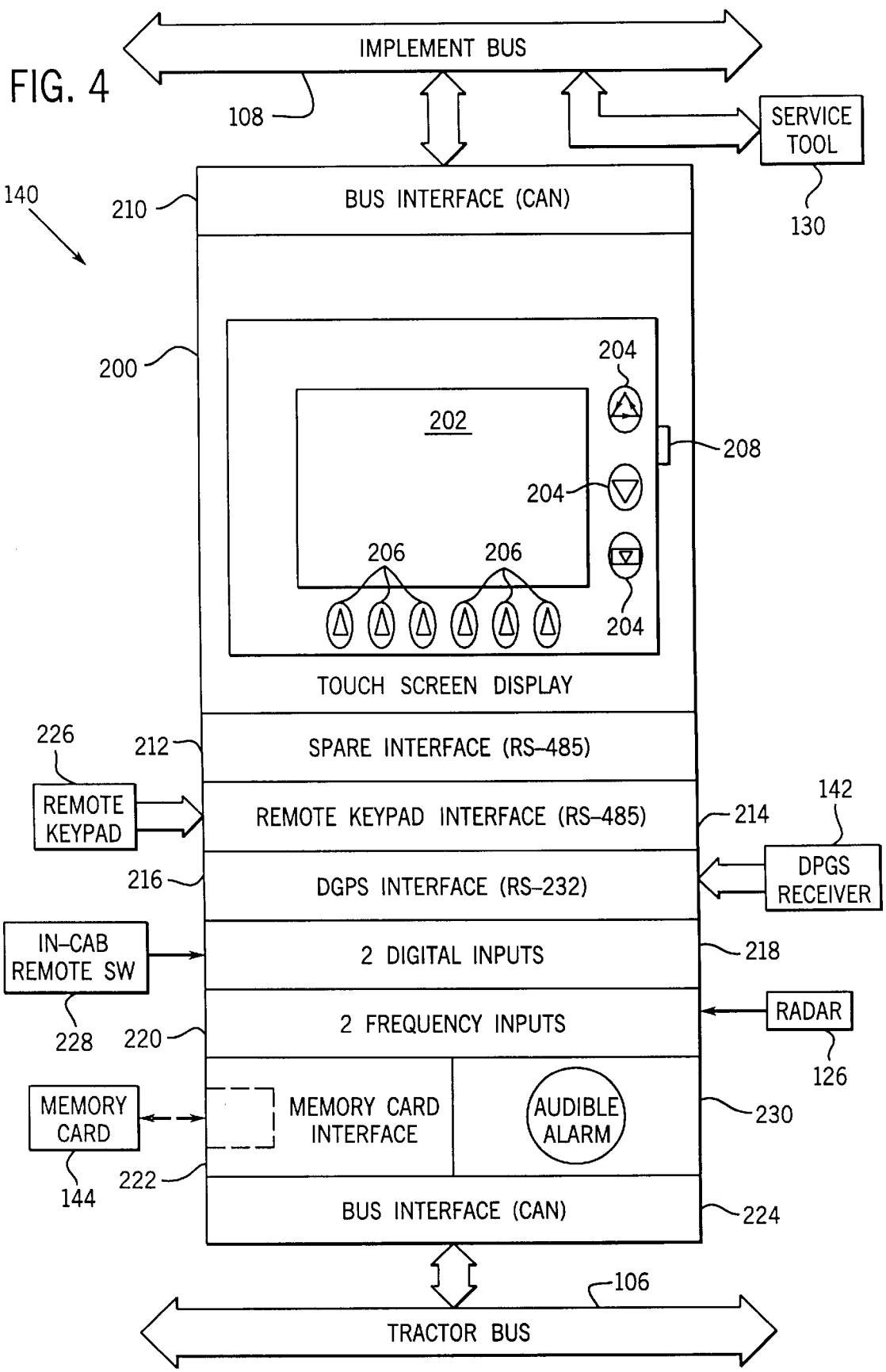
FIG. 4 is a block diagram of the cab display unit (CDU) of FIGS. 3A–3B, and the interfaces between the CDU and other components of the control system.

Referring to FIG. 4, CDU 140 is an ECU mounted in the cab of vehicle 102. CDU 140 includes a display unit 200 including a touch screen 202 (e.g., a TFT 10.4" color display with digital touch screen), system touch screen switches 204, reconfigurable touch screen switches 206 and system reset switch 208. A 1/2 VGA monochrome DMTN display with LED backlighting could also be used. CDU 140 has interfaces 210–224 for implement bus 108, a remote keypad 226, DGPS receiver 142, digital inputs (e.g., an in-cab remote switch 228), frequency inputs such as radar 126, memory card 144 and tractor bus 106. CDU 140 includes an audible alarm 230. A processor (e.g., ARM LH74610 RISC processor) coupled to memory circuits (e.g., RAM, EEPROM, Flash EPROM) provides control for CDU 140.

Control system 100 can control different planting implement applications. An operator uses touch screen 202 to navigate and perform common functions within each application. System touch screen switches 204 include a MODE switch for toggling between applications, a CALIBRATE switch for performing configuration, calibration and seed rate maintenance functions, and a UTILITY switch for performing file transfers on card 144. Touch screen switches 206 select between items on reconfigurable menus to control the operations of control system 100. Reset switch 208 resets control system 100. Remote keypad 226, mounted via a cable near the operator when CDU 140 is mounted elsewhere in the cab, duplicates touch screen switches 206. In-cab remote switch 228 allows the operator to remotely start and stop product metering. Alarm 230 is used to alert the operator to error and alarm conditions.

Both global and local operations of implement 10 are controlled by actuations of touch screen switches 204–206. The global functions include lighting control (e.g., turning on and off lights attached to frame 12), frame control (e.g., raising and lowering frame 12; folding and unfolding wings 20) and marker control (e.g., alternately raising and lowering markers attached to both sides 26 of frame 12 to mark the centerline of the next pass), blower 42 control (i.e., air pressure in drum 34 and bin 40 control) and positioner 37 control (i.e., brush 34 pressure control). Actuations needed to control the global functions depend on the particular implement. When switch actuations relate to lighting, frame or marker control, CDU 140 generates global command signals which are communicated to MIU 152 via bus 108 for controlling global output devices 160.

Referring again to the seed rate maintenance mode discussed above, the operator activates the mode switches 204 to enter the maintenance mode. In this mode, CDU 140 applies commands to MCC's 154 which causes drum 34 to rotate at the speed required to achieve selected seed delivery rates. (See the discussion of FIGS. 9A–9C below for more details.) CDU 140 monitors the seed rate signals generated by MIU 152, and displays the selected seed delivery rates and actual seed delivery rates on display 202. Based upon a comparison of the desired and actual seed delivery rates, the operator increments or decrements the desired seed delivery rate using touch screen 202 to cause CDU 140 and MCC 154 to vary the speed of blower 42 (i.e., bin 40 and drum 34 air pressure) and/or actuate positioners 3 to vary brush 35 pressure to bring the desired and actual seed delivery rates into correspondence.

The local implement functions include variable-rate application of products to a field. Touch screen switches 204–206 are actuated to control the rates in a manual or an automatic mode. In manual mode, the actuations set, increase or decrease the desired application rates for one or more products applied by each section. In automatic mode, the actuations select between one or more prescription maps stored on card 144. The maps include geo-referenced data representing desired application rates of one or more products at positions throughout a field. Desired rates are determined, for example, off-line using computer 150. The selected maps are indexed using positioning signals received by DGPS receiver 142 to determine the desired application rates which are then used to generate local product rate commands transmitted to MCCs 154.

Figure 5:
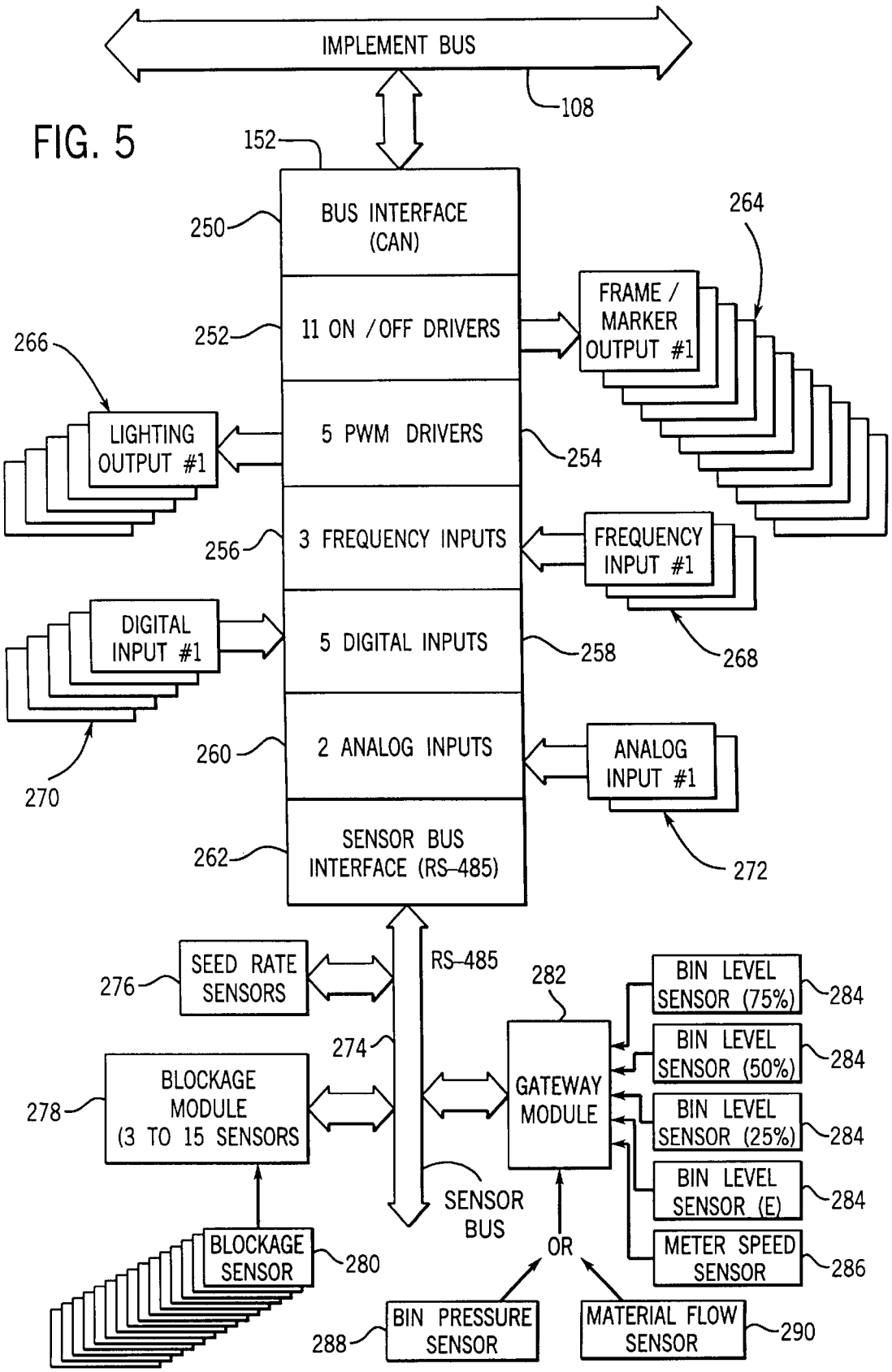
FIG. 5 is a block diagram of the monitor interface unit (MIU) of FIGS. 3A–3B, and the interfaces between the MIU and other components of the control system.

Referring to FIG. 5, MIU 152 is an ECU supported on frame 12 which includes interfaces 250–262 for implement bus 108, frame/marker outputs 264 (e.g., markers 50; wings 20), lighting outputs 266, frequency inputs 268, digital inputs 270, analog inputs 272 and sensor bus 274. MIU 152 is connected in control system 100 as shown below. Sensor bus 274 is coupled to seed rate sensors 276, a blockage module 278 coupled to blockage sensors 280, and a gateway module 282. Optical seed rate sensors 276 detect seeds passing through seed tubes to row units 14. Module 282 receives signals from optical bin level sensors 284, a meter speed sensor 286, and a bin pressure 288. Signals from bin level sensors 284 indicate when bins 40 of modules 16 are 75% full, 50% full, 25% full, and Empty. Sensor bus 274 is preferably an RS-485 network as described in U.S. Pat. No. 5,635,911, herein incorporated by reference. MIU 152 is controlled by a processor (e.g., an AN80C196CB) coupled to memory (e.g., RAM, EEPROM, Flash EPROM).

Control system 100 is a modular application control system which can be upgraded with additional controllers for expanded functionality. Initially, control system 100 includes CDU 140, implement bus 108 and MIU 152 which provide monitoring and global control functions. In the initial system, product application rates are controlled conventionally (e.g., by driving product metering devices using gears coupled to the implement wheels). FIGS. 6A–6C and 7A–7B show control system 100 in embodiments which provide for monitoring and global control functions for implements. Control system 100, however, can later be upgraded with MCCs 154 to provide variable-rate control. FIGS. 9A–9C and 10A–10B show upgraded control system 100 for the same implements.

Figure 6A:
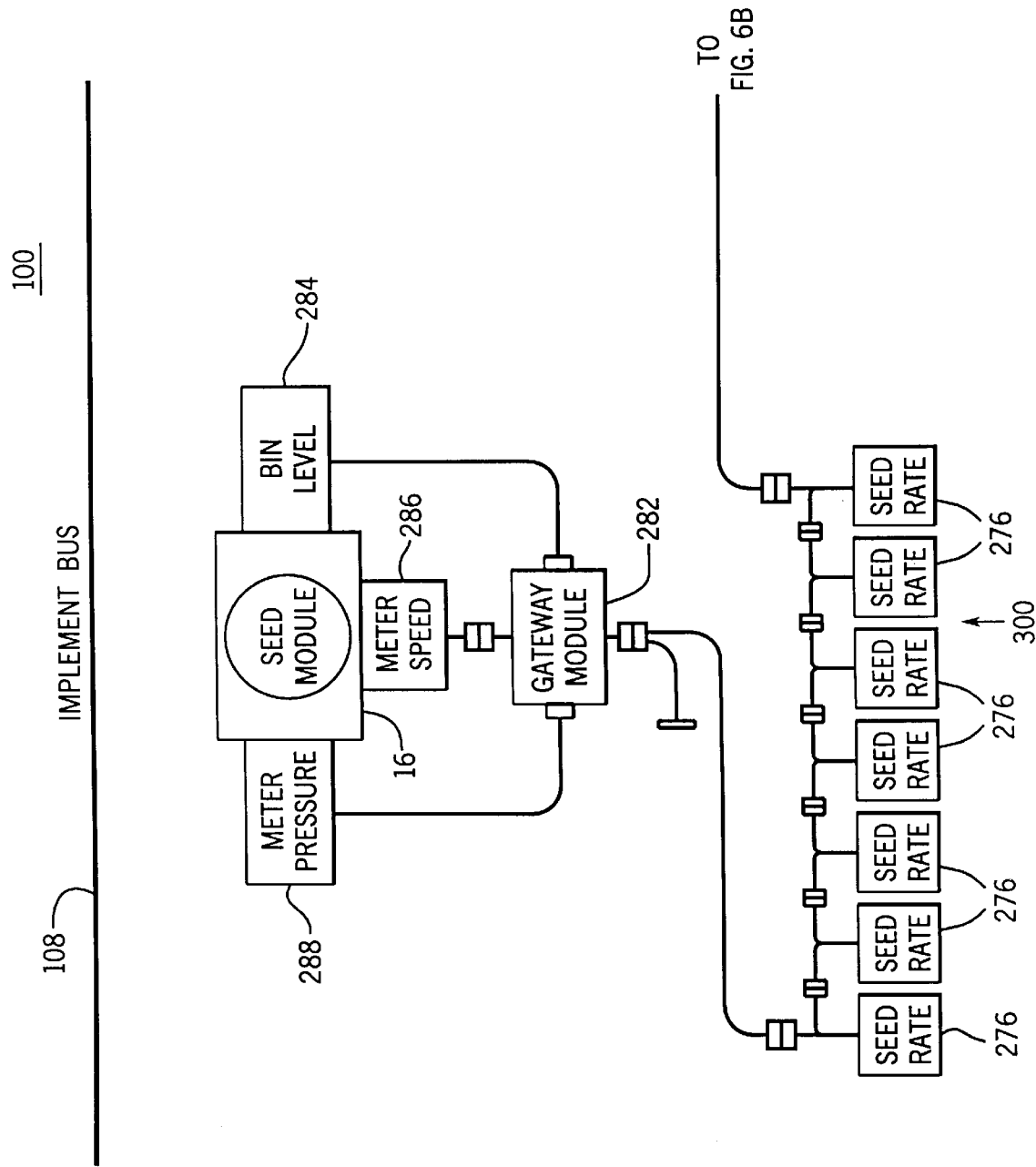
FIGS. 6A–6C depict a block diagram of a control system for the planting implement of FIG. 1 including an MIU for monitoring seed rate sensors coupled to the row units.
Figure 6B:
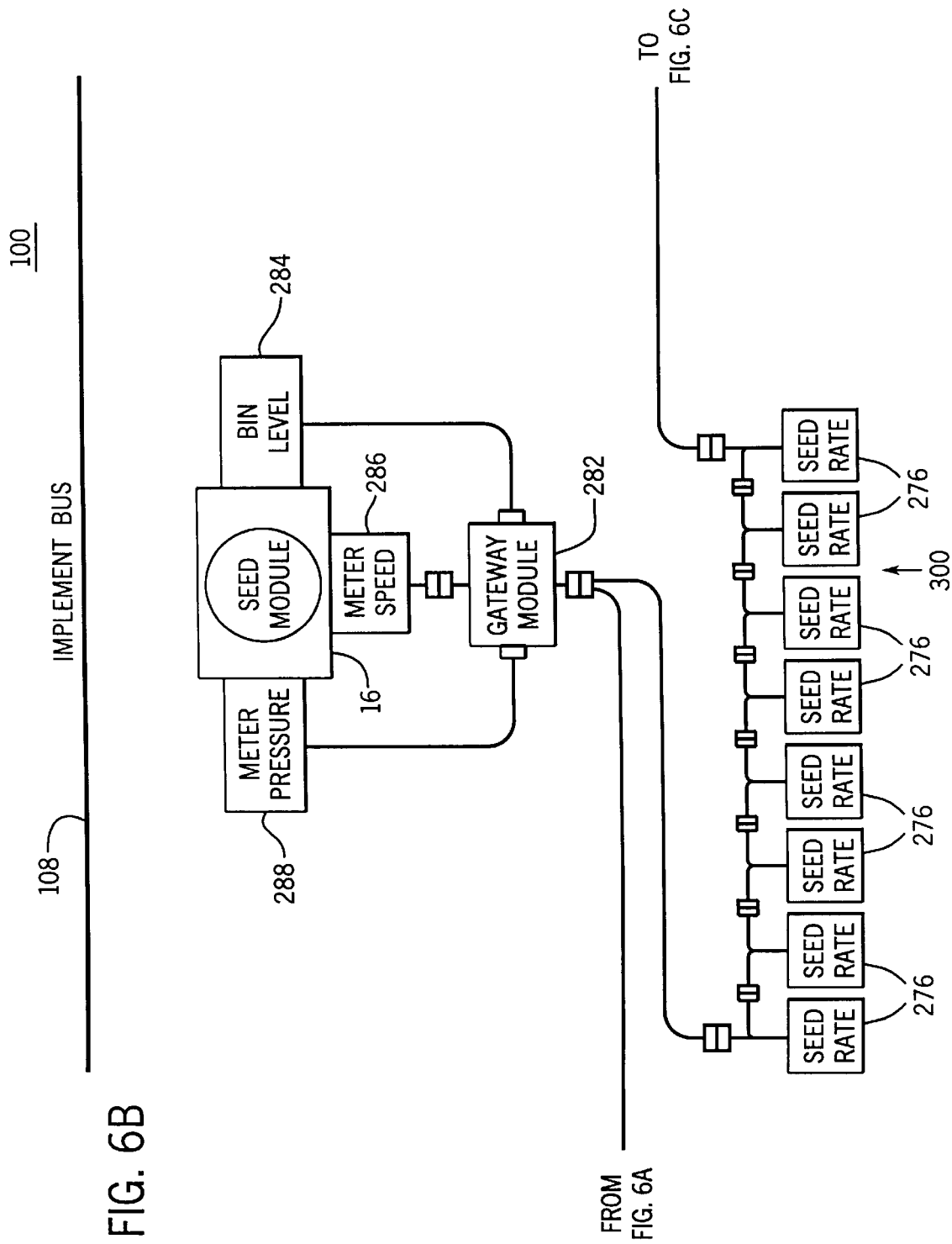
Figure 6C:
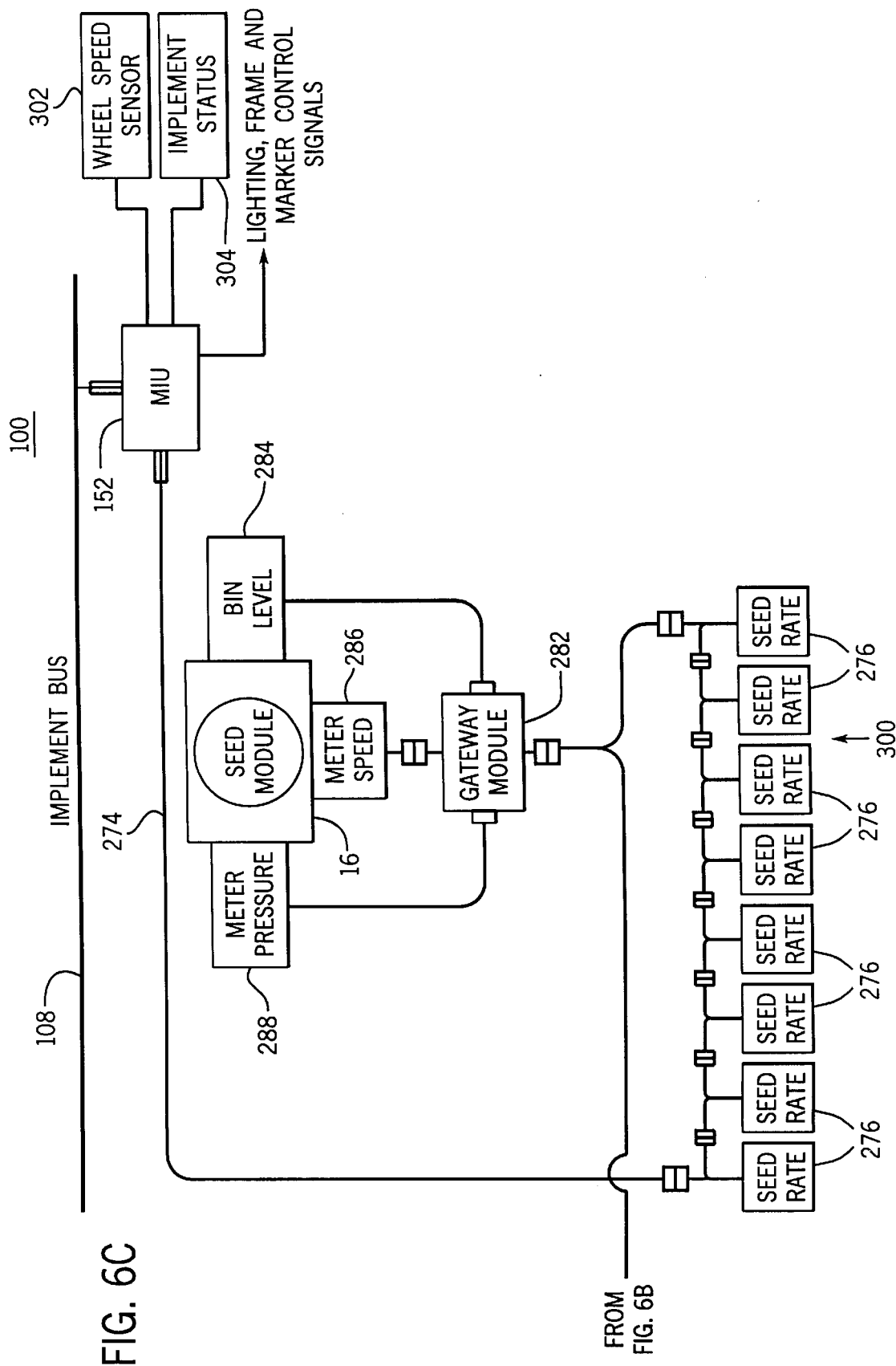

Referring to FIGS. 6A–6C, control system 100 controls a 12/23 SRC Cyclo Planter implement 10 which includes three sections 300, each supporting multiple (e.g., 7, 8 and 8) row units 14 configured to apply seeds to a field. Seeds are metered by a seed module 16 on each section 300. MIU 152 receives global command signals via bus 108 from CDU 140, and transmits back monitored data. MIU 152 receives speed signals used to calculate seeding data (e.g., area seeded) from a sensor 302 coupled to the planter's wheels. MIU 152 also receives signals indicating whether implement 10 is up or down from a status sensor 304. The application of products is disabled when implement 10 is raised, and is enabled with implement 10 down and ground speed above a predetermined value (e.g., 0.22 m/sec.).

Sensor bus 274 is connected to a seed rate sensor 276 associated with each row unit 14. MIU 152 monitors seed application rates using signals received from seed rate sensors 276, and sends seed rate data to CDU 140 via bus 108. Bus 274 is also coupled to a gateway module 282 on each section 300 to monitor the status of each seed module 16 using signals received from bin level sensors 284, meter speed sensor 286, and bin pressure sensor 288. MIU 152 transmits meter status to CDU 140. Connectors separate MIU 152, sensors 276 and gateway modules 282.

Figure 7A:
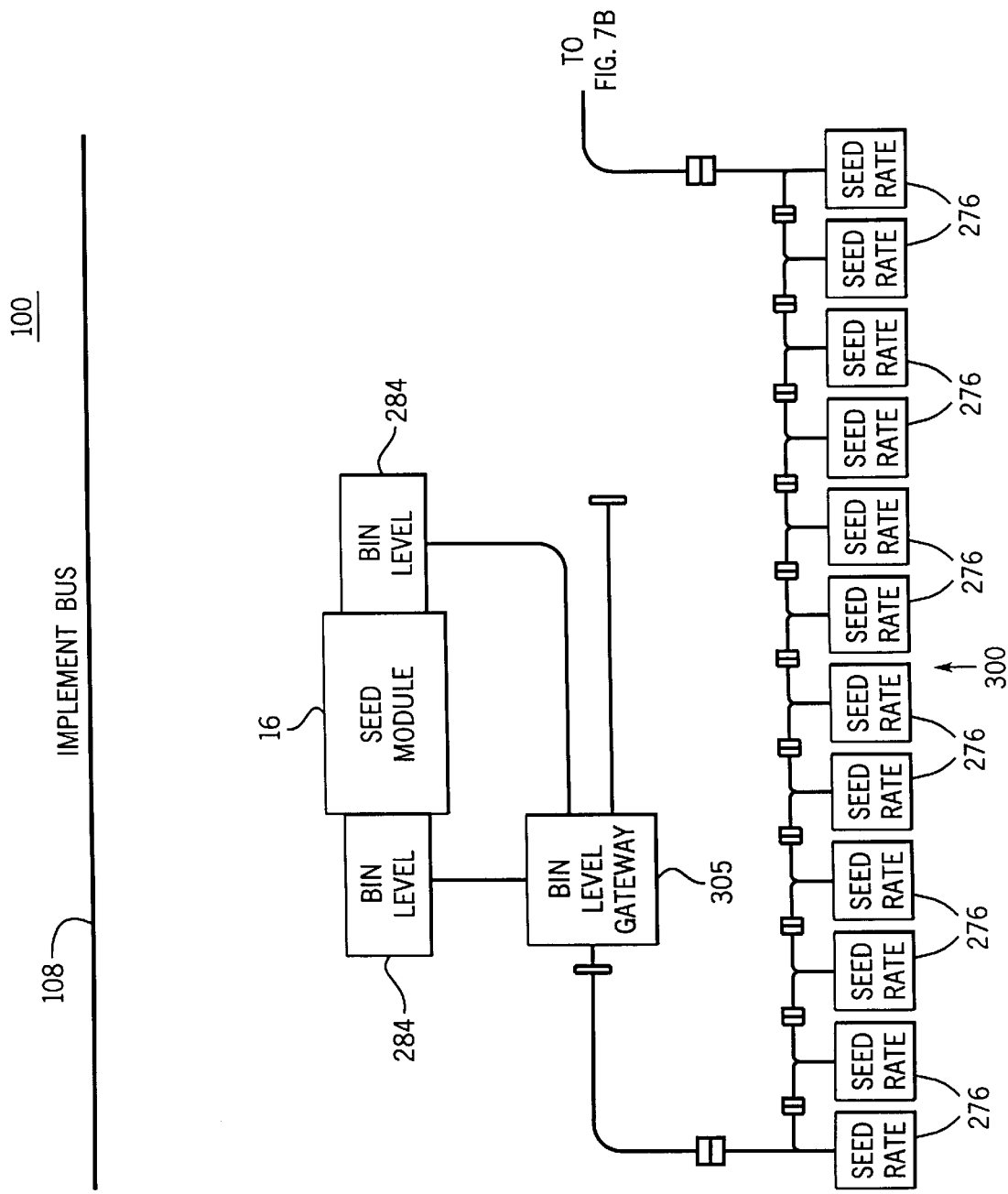

Referring to FIGS. 7A–7B, another embodiment of control system 100 is configured to control a conventional 5500 Soybean Special grain drill including two sections 300. Each section 300 supports multiple (e.g., 12 and 12) row units 14 configured to apply seeds to a field. Seeds are metered by a seed module 16 on each section 300. MIU 152 receives global command signals from CDU 140, and returns monitored data. MIU 152 also receives speed signals used to calculate seeding data from sensor 302 coupled to the drill's wheels, and receives signals indicating whether implement 10 is up or down from sensor 304. Application of products is disabled when implement 10 is raised.

Sensor bus 274 connects to a seed rate sensor 276 associated with each row unit 14. MIU 152 monitors seed application rates using signals received from sensors 276, and sends seed rate data to CDU 140. Bus 274 is also coupled to bin level gateway modules 305 which monitor and receive bin level signals from bin level sensors 284 on each section 300. Bin status data is transmitted to CDU 140 and connectors separate MIU 152 and sensors 276 and 284.

Figure 8:
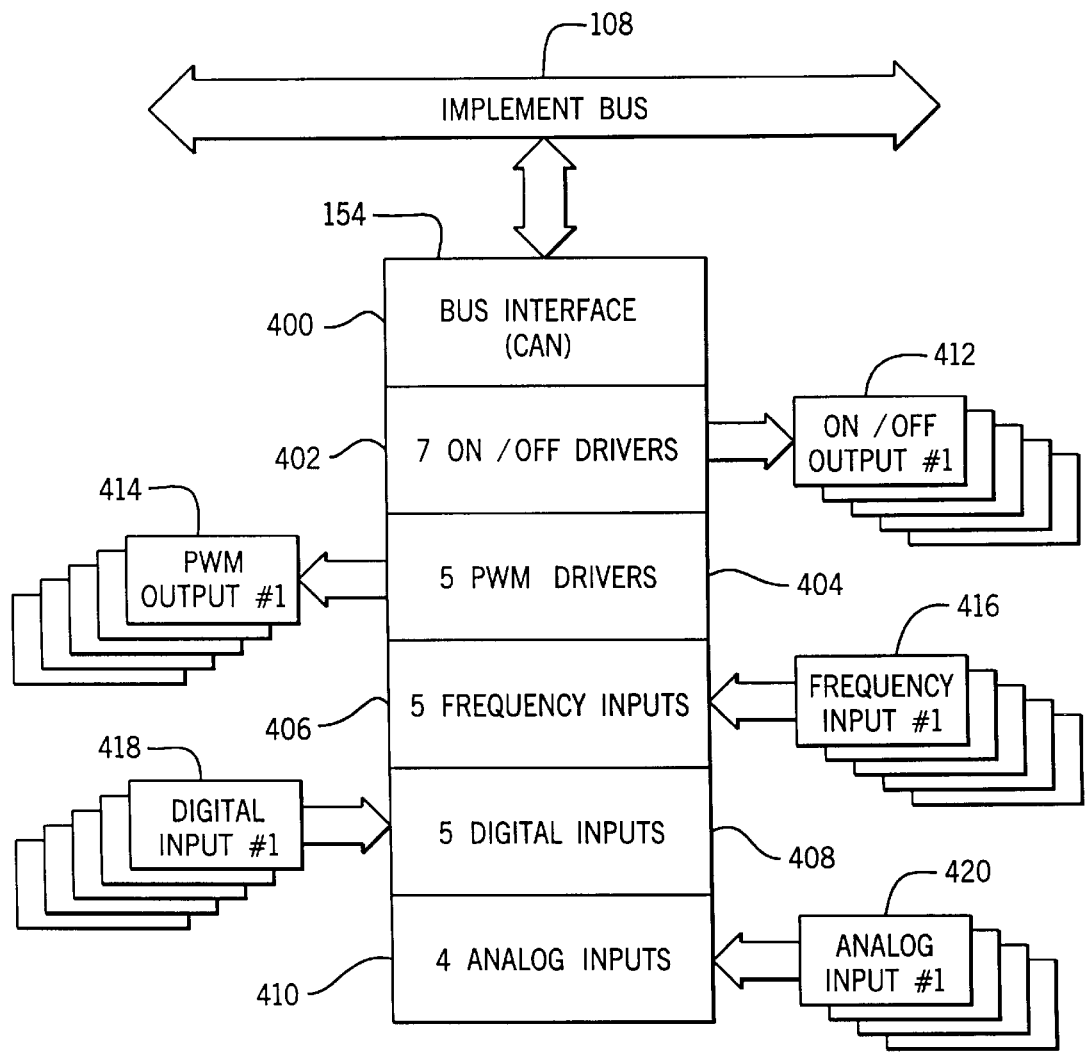
FIG. 8 is a block diagram of one multi-channel controller (MCC) of FIGS. 3A–3B, and the interfaces between the MCC and other components of the control system.

Control system 100 may be upgraded by installing a removable MCC 154 on each frame section 300 to provide local variable-rate control. Referring to FIG. 8, each MCC 154 includes interfaces 400–410 for implement bus 108, on/off outputs 412 for driving valves, PWM outputs 414 for driving local product metering devices such as cyclo seed meter 32, frequency inputs 416, digital inputs 418, and analog inputs 420. Connections between MCC 154 and control system 100 are shown below. A processor (e.g., an AN80C196CB) coupled to memory circuits (e.g., RAM, EEPROM, Flash EPROM) provides control for MCC 154.

Figure 9A:
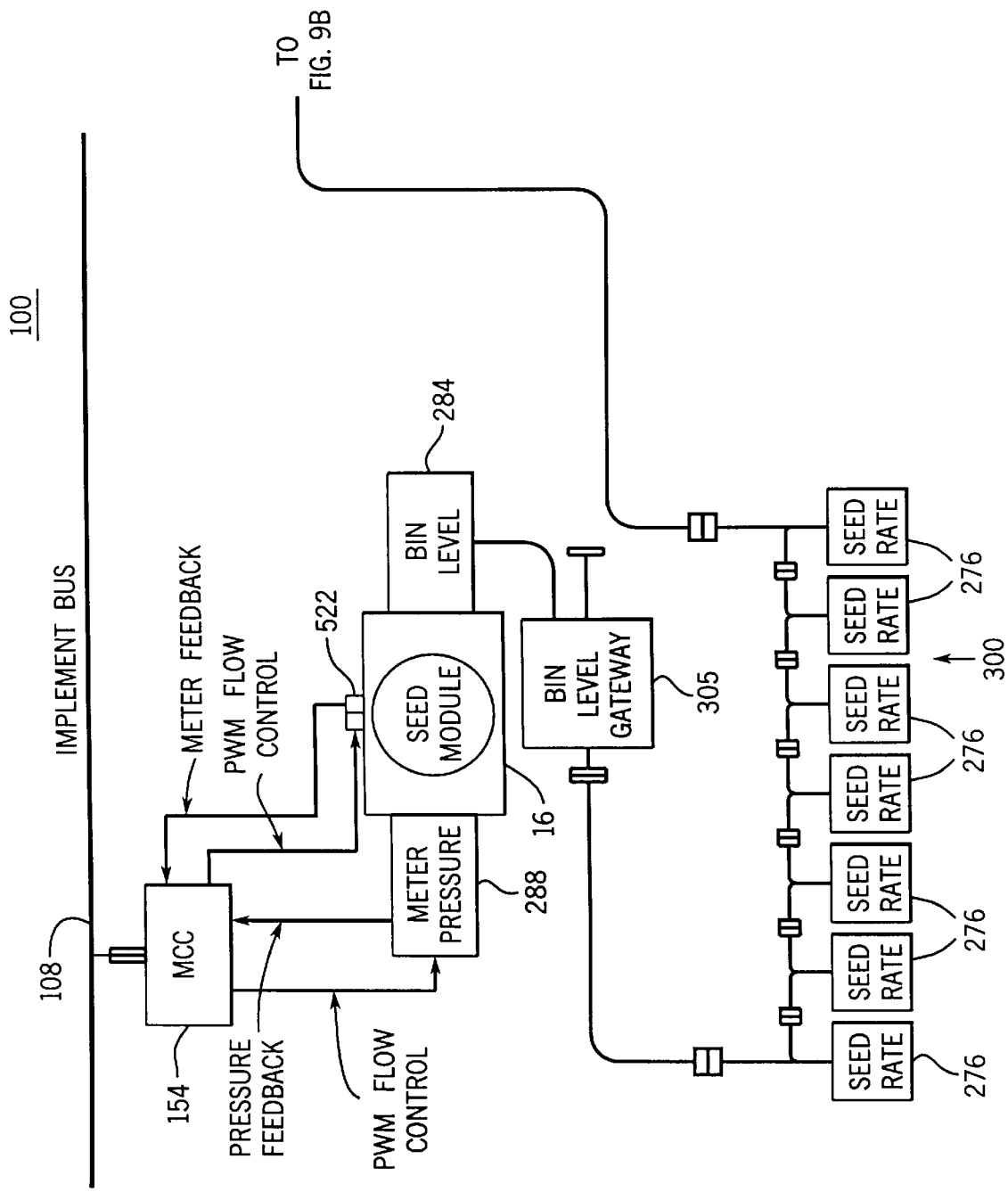
FIGS. 9A–9C depict a block diagram of a control system for the planting implement of FIG. 1 which further includes local MCCs to control the planting rates of each section.
Figure 9B:
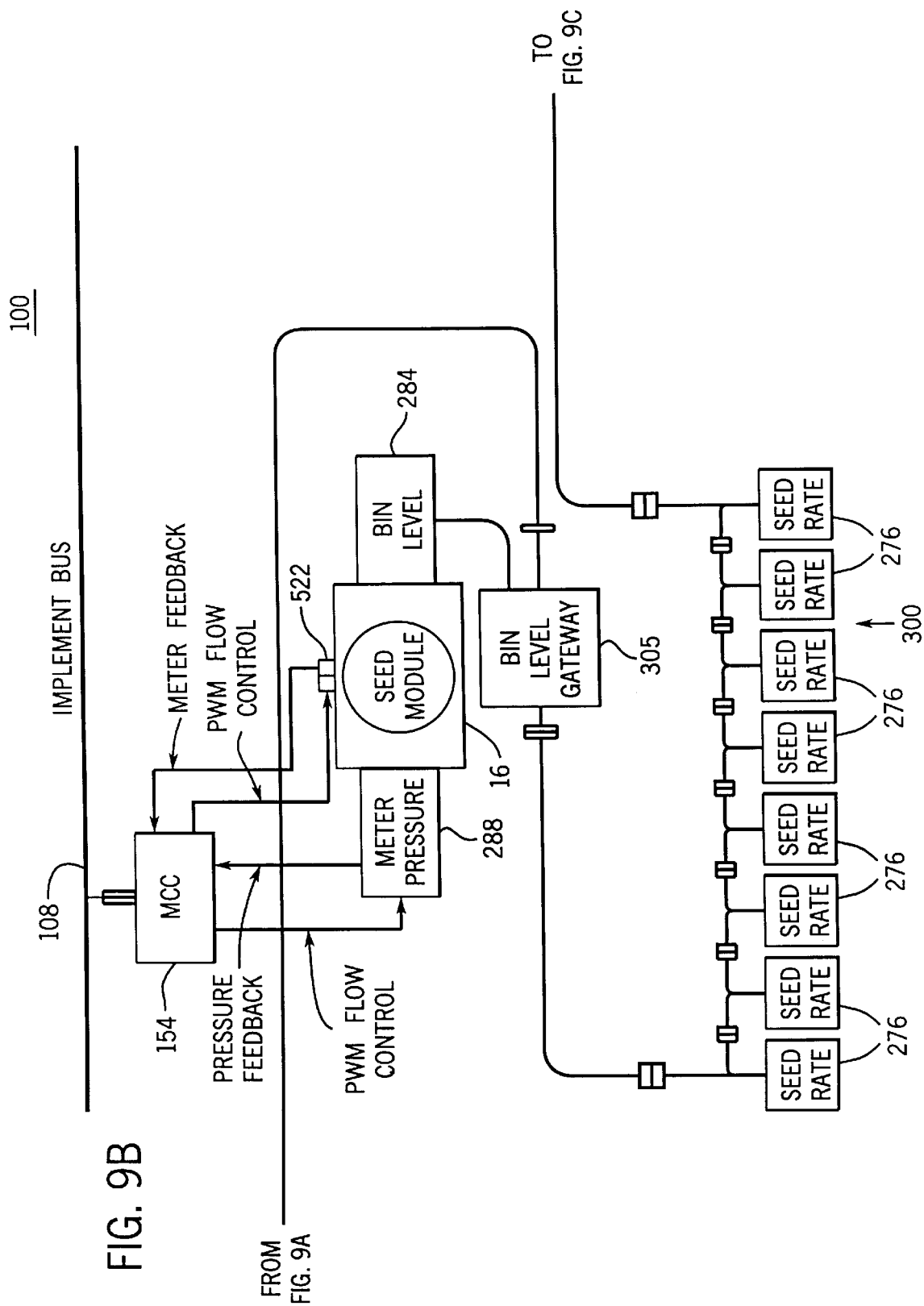
Figure 9C:
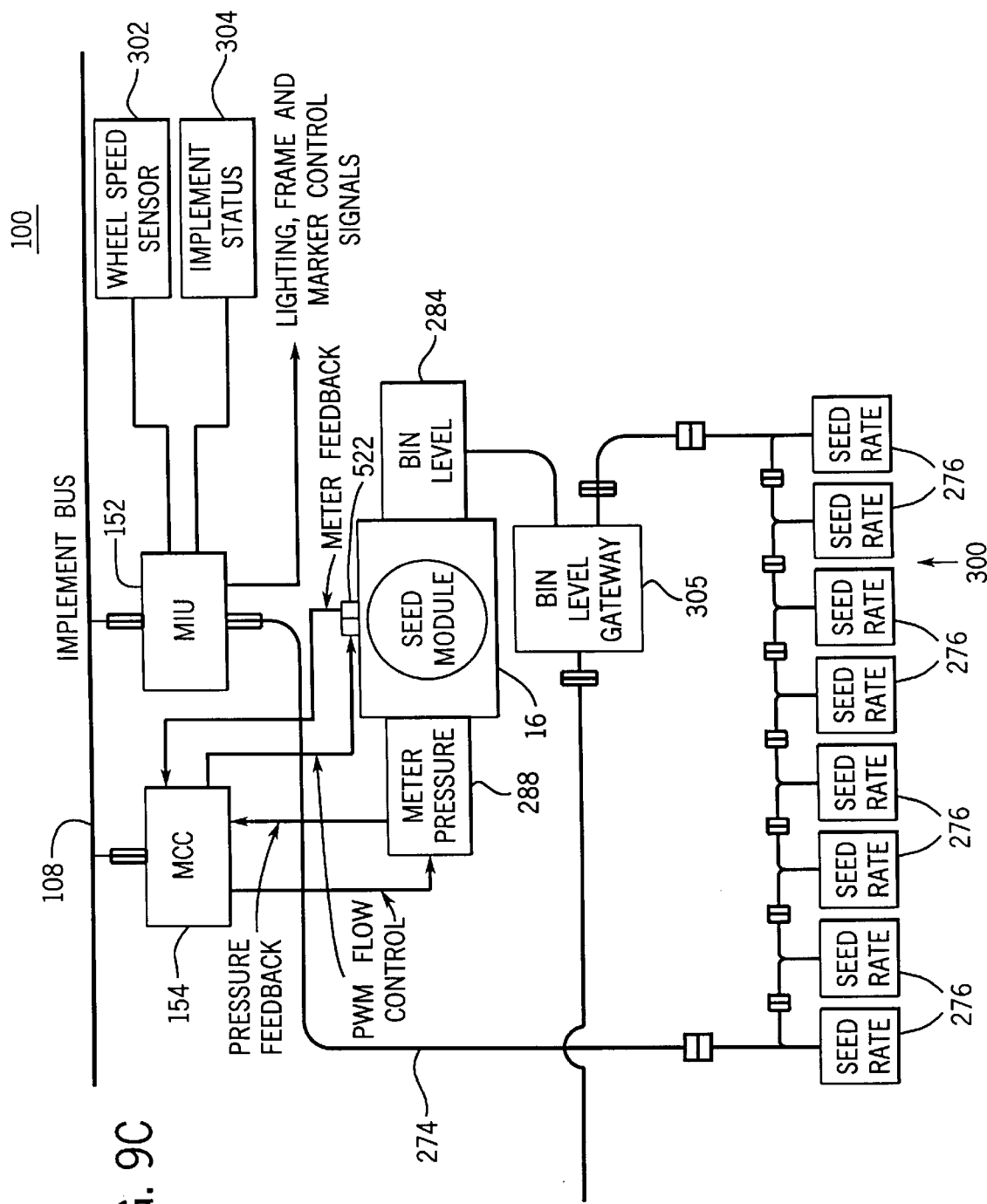

Referring to FIGS. 9A–9C, another embodiment of control system 100 further provides variable-rate control of the Cyclo Planter. In contrast to FIGS. 6A–6C, MCCs 154 control the seed application rates of each section 300 based on rate command signals received from CDU 140 via bus 108. Each MCC 154 converts the rate command signals into PWM control signals which are applied to a cyclo seed meter 32 (i.e., drum 34) on seed module 16 (e.g., the PWM control signals are applied to a hydraulic valve assembly which regulates the flow of hydraulic fluid to motor 38(. MCC 154 receives meter feedback speed signals from seed meter 32, and communicates the meter speed feedback data back to CDU 140 for display. MCC 154 could also use the meter speed feedback signals for closed-loop metering control. Each MCC 154 also applies control signals to bin pressure or material flow sensor 288, receives feedback signals from sensor 288, and communicates bin pressure data back to CDU 140 for display.

Figure 10A:
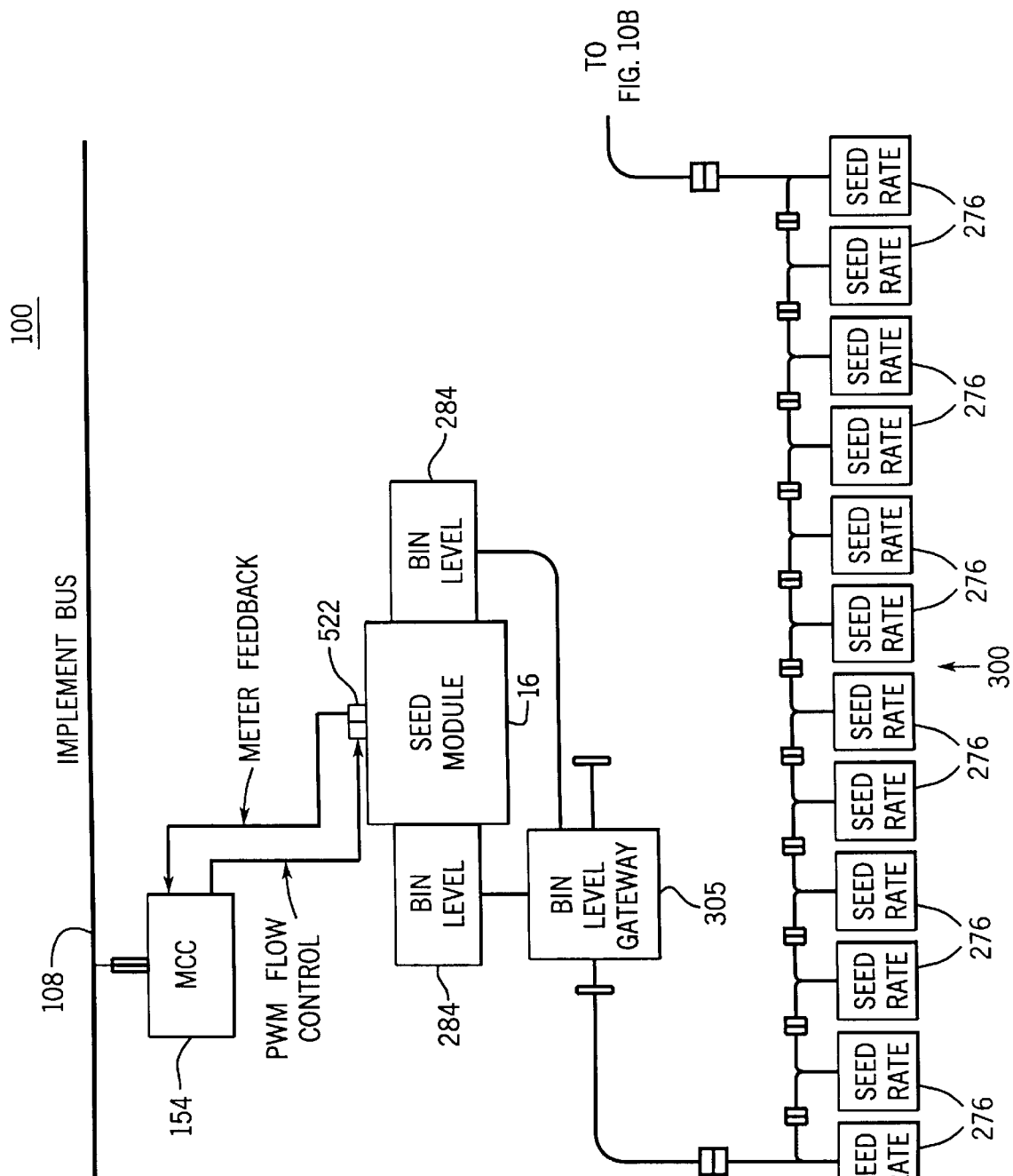
FIGS. 10A–10B depict a block diagram of a control system for the drill as in FIGS. 7A–7B which further includes local MCCs to control the seed planting rates of each section.
Figure 10B:
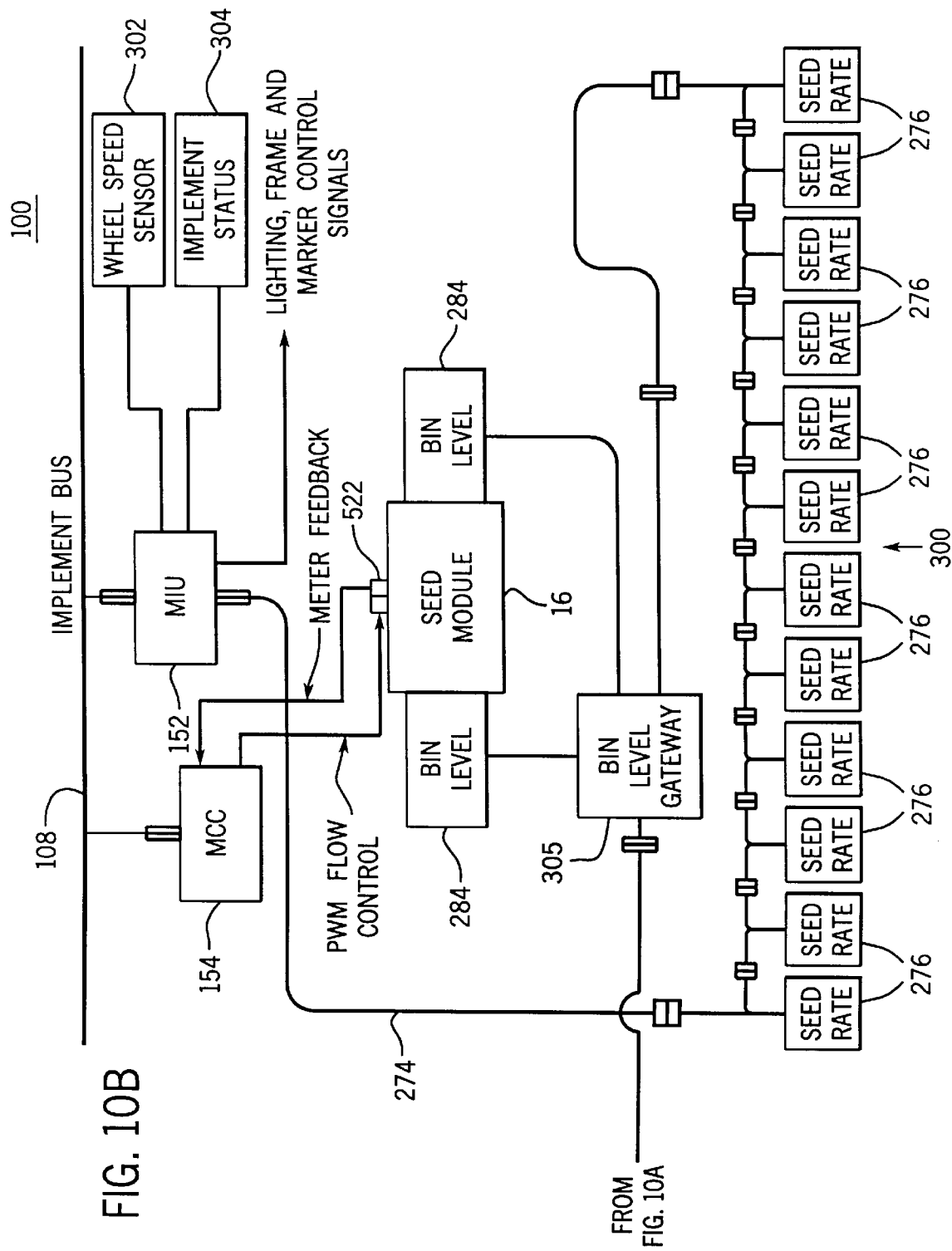

Referring to FIGS. 10A–10B, another embodiment of control system 100 further provides variable-rate control of the conventional drill. In contrast to FIGS. 7A–7B, MCCs 154 control the rates at which seeds are applied by sections 300 using seed rate command signals received from CDU 140. Each MCC 154 converts the rate command signals into rate control signals which are applied to a seed meter 32 on each seed module 16. MCCs 154 receive feedback speed signals from meter 32, and communicate meter speed data back to CDU 140 for display. MCCs 154 can also use the speed feedback signals for closed-loop metering control.

Figure 11A:
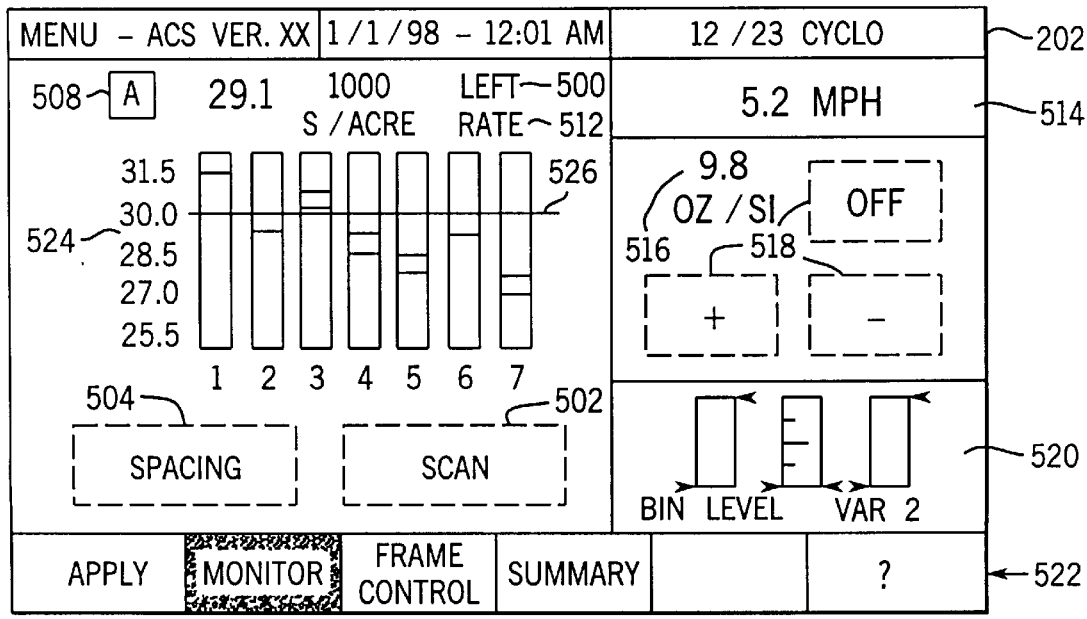
FIGS. 11A–11C show a sequence of CDU display screens allowing the operator to monitor the performance of each section and row unit of the implement, and to determine whether each section and row unit is planting seed at an actual rate consistent with a desired seed planting rate.
Figure 11B:
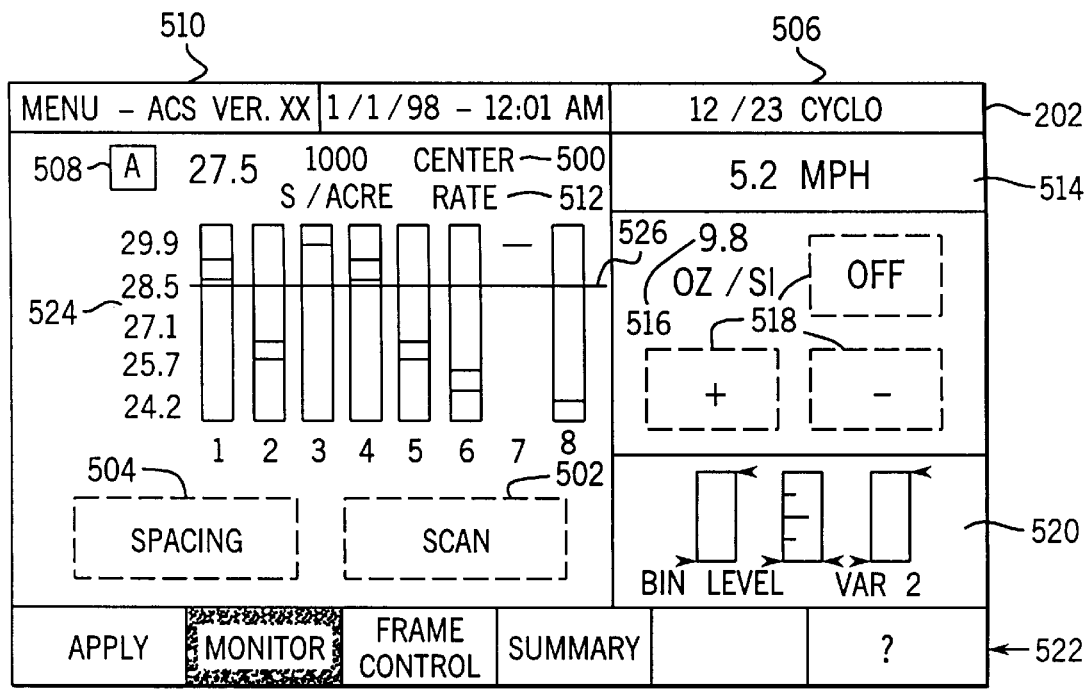
Figure 11C:
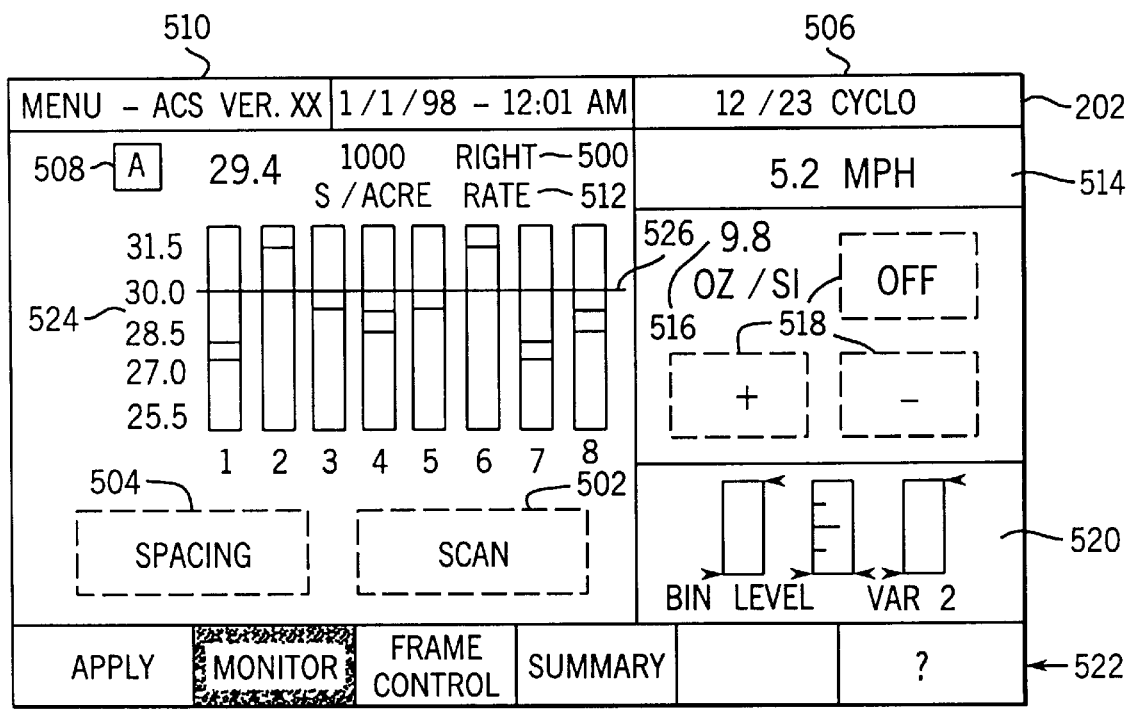

Referring to FIGS. 11A–11C, control system 100 monitors the actual performance of implement 10 and shows actual performance data to the operator on display 202 of CDU 140. To efficiently use the display, performance data for each section 300 of implement 10 is displayed sequentially. The location of the section 300 for which data is currently being displayed is labeled at reference numeral 500. For example, FIGS. 11A–11B and 11C display performance data for the left, center and right sections 300, respectively, of the Cyclo Planter of FIGS. 6A–6C and 9A–9C. The CDU screens for the drill of FIGS. 7A–7B and 10A–10B sequence between left and right sections 300. The performance of implement 10 is scanned by showing data for each section 300 for a predetermined time period (e.g., 2 sec.) before showing data for the next section 300. The sections are continually scanned. However, a touch-screen scan switch 502 allows the operator to pause the scan procedure on a selected section 300, and to resume scanning. A second touch screen switch 504 is used to display seed spacing.

The displayed data includes the implement type 506 (e.g., "12/23 Cyclo"), product type 508 (e.g., "A" for product stored in bin a; "B" for product in bin B, etc.), section average rate 510 (e.g., average delivery rate of 29,100 s/acre across row units 14 of the left section), display identification 512 (e.g., "Rate"), implement speed 514 (e.g., "5.2 mph"), bin pressure 516 (e.g., "9.8 oz/si"), bin pressure controls 518 (e.g., "OFF" "+" and "–"), bin level 520, menu bar 522 and bar graph 524.

Implement type 506 may differ since control system 100 can be programmed for use with different implement types. Implement speed 514 is determined using signals from wheel speed sensors 302 (or radar 126). Bin pressure controls 518 provide control over air pressure in module 16. Bin level 520 displays the height of product in one or more bins 40. Alarm 230 alerts the operator when the lowest bin level is reached. Menu bar 522 allows the operator to select the CDU mode, and includes a "MONITOR" touch-screen switch to select performance monitoring.

Based upon the sensed signals, control system 100 calculates and displays performance monitor data such as planting rate (Seed_Rate), seed spacing (Seed_Spacing), seed metering performance (Seed_Meter_Perf), percent singles metered (%_Singles_Metered), and accumulated metering performance (Accumulated_Meter_Perf). For each data item, CDU 140 displays a section average and a bar graph visually representing data for each row unit 14.

Planting rate is defined as the actual amount of product (e.g., number of seeds) applied over an area (hectare or acre):

Seed_Rate=Seed_Sensor_Count/(Distance_Traveled*Row_Width)

wherein Seed_Sensor_Count is the number of seeds counted by seed sensors 276, Distance_Traveled is the product of ground speed (sensed by wheel speed sensor 302) and time, and Row_Width is the width between row units 14. Seed spacing, displayed in response to actuations of switch 504, is defined as the spacing (cm or in) between seeds:

Seed_Spacing=Distance_Traveled/Seed_Sensor_Count

Seed meter performance is defined as the actual seed delivery rate divided by a theoretical or target rate:

Seed_Meter_Perf=(Seed_Rate/Target_Seed_Rate)*100 wherein Target_Seed_Rate is the target seed rate based upon either a feedback speed signal from meter 32 (e.g., 5 sec average) and the arrangement of the seed drum, or upon the commanded seed planting rate. Percent singles metered is defined as the count from seed sensors 276 of metered seeds passing through seed tube 30 one at a time divided by the total number of seeds over an interval:

%_Singles_Metered=Counted_Singles/(Target_Seed_Rate*Distance_Traveled*Row_Width)

Accumulated meter performance is defined as an operator-resettable running average of the seed meter performance:

Accumulated_Meter_Perf$_n$=(Accumulated_Meter_Perf$_{n-1}$*(n-1)+Seed_Meter_Perf)/n The seed planting rate for n row units 14 of each section 300, averaged over one second and five seconds, respectively, are as follows:

Value=(ΣSeed_Rate$_n$)/n

Section_Average$_n$=(Value$_{n-4}$+Value$_{n-3}$+Value$_{n-2}$+Value$_{n-1}$+Value$_n$)/n The five-second section average ("Section_Average") is used for display (e.g. used for section average rate 510), except that the current seed rate value ("Value") is used for the accumulated meter performance.

Bar graph 524 includes bars (e.g., bars 1–7 in FIG. 11A; bars 1–8 in FIGS. 11B and 11C) showing the planting performance for row units 14 of each section 300 of the 12/23 Cyclo Planter. Five ranges along the vertical axis represent 85%, 90%, 95%, 100% and 105% of a target seed delivery rate, with 100% of the target rate marked by a horizontal line 526. The target rate, set manually or automatically based upon the implement position a d a prescription map, may differ for each section 300 during variable-rate application. For example, the target rate is 30,000 s/acre for the left and right sections (FIGS. 11A and 11C) and 28,500 s/acre for the center section (FIG. 11B). Actual delivery rates for row units 14 are shown by the bars on graph 524. Row unit 1 of the left section, for example, has applied seed at an actual rate of 31,500 s/acre. Displaying the actual rate based upon the target rate normalizes the actual seed delivery rate. Thus, bar graph 524 is an easily understood performance monitor for each section and row unit of implement 10 since deviations in rates are represented by differences between horizontal line 26 and the actual rate markers. An operator noticing large deviations between actual and target seed rates can re-adjust or repair implement 10.

Other application parameters calculated by control system 100, and displayed on CDU 140, include the total area (Hectares or acres) the system has monitored during its lifetime, the total area monitored during the season, and the total area monitored in the field. The lifetime area counter is non-resettable, while the season area and field area counters are resettable by the operator. The implement performance is monitored during application of seed, and is enabled when the implement status switch 304 indicates that implement 10 is down and the ground speed exceeds a predetermined value (e.g., 0.22 meter/sec.).

While the embodiments illustrated in the FIGURES and described above are presently preferred, it should be understood that these embodiments are offered by way of example only. The control system disclosed herein may be modified for use on other planters, conventional or air drills, other planting implements and material spreaders having variable-rate control, and other electronically-controlled application implements. The invention is not intended to be limited to any particular embodiment, but is intended to extend to modifications that nevertheless fall within the scope of the claims.

What is claimed is:

1. A seed planting system for planting seed in soil at desired rates, the system comprising:

a tractor including an operator station;

a seed planter including a seed channel having an exit through which a number of seeds move toward the soil, and a singulating seed meter for singulating seed and delivering the singulated seed to the seed channel;

an electronic seed sensor attached to the seed planter to generate a seed signal representative of the number of seeds;

an electronic display supported at the operator station, the display generating images in response to display signals;

at least one operator-activated control supported at the operator station; and a digital processing circuit coupled to the seed sensor, the display and the operator-activated control, wherein the processing circuit monitors the seed signal, determines an actual seed delivery rate based upon the number of seeds and a time period during which the seed signal is monitored, applies a display signal to the display to generate an image representative of the actual seed delivery rate, and modifies a parameter of the seed planter which affects the singulating accuracy of the singulating seed meter in response to activation of the operator-activated control.

2. The system of claim 1, wherein the channel is defined by a tube through which the seeds are delivered toward the soil.

3. The system of claim 2, wherein the seed sensor changes a value of the seed signal in response to the passage of a seed through the seed channel.

4. The system of claim 3, wherein the seed meter includes a seed drum and a mechanism oriented relative to the seed drum to disperse seeds within the seed drum and the parameter is representative of the orientation of the mechanism relative to the seed drum.

5. The system of claim 3, wherein the display is an LCD display.

6. The system of claim 3, wherein the seed planter includes an air source for pressurizing the singulating seed meter with an air flow and the parameter is representative of the air flow.

7. A seed planting monitoring system useable with a planting arrangement having an operator station, a seed delivery system having a target seed delivery rate controlled by at least one control signal, a seed channel having an exit through which a number of seeds move toward soil in which the seeds are planted, and a singulating seed meter for singulating seed and delivering the singulated seed to the seed channel, the system comprising:

an electronic seed sensor attachable to the seed delivery system to generate a seed signal representative of the number of seeds;

an electronic display adapted to be supported at the operator station, the display generating images in response to display signals;

an operator interface located at the operator station; and a digital processing circuit coupled to the seed sensor, the display and the operator interface, wherein the processing circuit monitors the seed signal, determines an actual seed delivery rate based upon the number of seeds and a time period during which the seed signal is monitored, applies a display signal to the display to generate an image representative of the actual seed delivery rate, and modifies a parameter of the seed delivery system which affects the singulating accuracy of the singulating seed meter in response to activation of the operator interface.

8. The system of claim 7, wherein the processing circuit generates and applies the control signal to the seed delivery system, and applies the display signal to the display such that the image is also representative of the target seed delivery rate.

9. The system of claim 8, wherein the channel is located in a tube through which the seeds are delivered toward the soil.

10. The system of claim 9, wherein the seed sensor changes a value of the seed signal in response to the passage of a seed through the seed channel.

11. A seed planting system for planting seed in soil at desired rates, the system comprising:

a tractor including an operator station;

a seed planter including a seed channel having an exit through which a number of seeds move toward the soil, wherein the channel is defined by a tube through which the seeds are delivered toward the soil, wherein the seed planter includes a delivery control mechanism including an air source for moving the seed through the tube with an air flow and a parameter of the seed planter is representative of the air flow;

an electronic seed sensor attached to the seed planter to generate a seed signal representative of the number of seeds, wherein the seed sensor changes a value of the seed signal in response to the passage of a seed through the seed channel;

an electronic display supported at the operator station, the display generating images in response to display signals;

at least one operator-activated control supported at the operator station; and a digital processing circuit coupled to the seed sensor, the display and the operator-activated control, wherein the processing circuit monitors the seed signal, determines an actual seed delivery rate based upon the number of seeds and a time period during which the seed signal is monitored, applies a display signal to the display to generate an image representative of the actual seed delivery rate, and modifies a parameter of the seed planter which affects the actual seed delivery rate in response to activation of the operator-activated control.

12. A seed planting system for planting seed in soil at desired rates, the system comprising:

a tractor including an operator station;

a seed planter including a seed channel having an exit through which a number of seeds move toward the soil, wherein the channel is defined by a tube through which the seeds are delivered toward the soil;

an electronic seed sensor attached to the seed planter to generate a seed signal representative of the number of seeds, wherein the seed sensor changes a value of the seed signal in response to the passage of a seed through the seed channel;

an electronic display supported at the operator station, the display generating images in response to display signals;

at least one operator-activated control supported at the operator station; and a digital processing circuit coupled to the seed sensor, the display and the operator-activated control, wherein the processing circuit monitors the seed signal, determines an actual seed delivery rate based upon the number of seeds and a time period during which the seed signal is monitored, applies a display signal to the display to generate an image representative of the actual seed delivery rate, and modifies a parameter of the seed planter which affects the actual seed delivery rate in response to activation of the operator-activated control, wherein the image includes a bar graph including bars representative of the actual seed delivery rate and a desired seed delivery rate.

13. A seed planting system for planting seed in soil at desired rates, the system comprising:

a tractor including an operator station;

a seed planter including a seed channel having an exit through which a number of seeds move toward the soil, wherein the channel is defined by a tube through which the seeds are delivered toward the soil;

an electronic seed sensor attached to the seed planter to generate a seed signal representative of the number of seeds, wherein the seed sensor changes a value of the seed signal in response to the passage of a seed through the seed channel;

an electronic display supported at the operator station, the display generating images in response to display signals;

at least one operator-activated control supported at the operator station; and a digital processing circuit coupled to the seed sensor, the display and the operator-activated control, wherein the processing circuit monitors the seed signal, determines an actual seed delivery rate based upon the number of seeds and a time period during which the seed signal is monitored, applies a display signal to the display to generate an image representative of the actual seed delivery rate, and modifies a parameter of the seed planter which affects the actual seed delivery rate in response to activation of the operator-activated control, wherein the image includes a bar graph including a bar representative of the actual seed delivery rate and referenced to a desired delivery rate.

14. A seed planting monitoring system useable with a planting arrangement having an operator station, a seed delivery system having a target seed delivery rate controlled by at least one control signal, and a seed channel having an exit through which a number of seeds move toward soil in which the seeds are planted, the system comprising:

an electronic seed sensor attachable to the seed delivery system to generate a seed signal representative of the number of seeds;

an electronic display adapted to be supported at the operator station, the display generating images in response to display signals;

an operator interface located at the operator station; and a digital processing circuit coupled to the seed sensor, the display and the operator interface, wherein the processing circuit monitors the seed signal, determines an actual seed delivery rate based upon the number of seeds and a time period during which the seed signal is monitored, applies a display signal to the display to generate an image representative of the actual seed delivery rate, and modifies a parameter of the seed delivery system which affects the actual seed delivery rate in response to activation of the operator interface, wherein the processing circuit generates and applies the control signal to the seed delivery system, and applies the display signal to the display such that the image is also representative of the target seed delivery rate, wherein the image includes a bar graph including bars representative of the respective target and actual seed delivery rates.

15. A seed planting monitoring system useable with a planting arrangement having an operator station, a seed delivery system having a target seed delivery rate controlled by at least one control signal, and a seed channel having an exit through which a number of seeds move toward soil in which the seeds are planted, the system comprising:

an electronic seed sensor attachable to the seed delivery system to generate a seed signal representative of the number of seeds;

an electronic display adapted to be supported at the operator station, the display generating images in response to display signals;

an operator interface located at the operator station; and a digital processing circuit coupled to the seed sensor, the display and the operator interface, wherein the processing circuit monitors the seed signal, determines an actual seed delivery rate based upon the number of seeds and a time period during which the seed signal is monitored, applies a display signal to the display to generate an image representative of the actual seed delivery rate, and modifies a parameter of the seed delivery system which affects the actual seed delivery rate in response to activation of the operator interface, wherein the processing circuit generates and applies the control signal to the seed delivery system, and applies the display signal to the display such that the image is also representative of the target seed delivery rate, wherein the image includes a bar graph including a bar representative of the actual seed delivery rate and referenced to the target seed delivery rate.

16. The system of claim 15, wherein the planting arrangement includes a tractor, the seed delivery system is coupled to the tractor, and the operator station is a cab supported by the tractor.

17. A method of maintaining a seed planting rate of a seed planter from a cab of a tractor, the planter including a seed delivery system having a target seed delivery rate controlled by at least one control signal, a seed channel having an exit through which a number of seeds move toward soil in which the seeds are planted, and a singulating seed meter for singulating seed and delivering the singulated seed to the seed channel, the method comprising the steps of:

generating a seed signal representative of the number of seeds;

applying the at least one control signal to the seed delivery system to control the target seed delivery rate;

monitoring the seed signal to determine an actual seed delivery rate based upon the number of seeds and a time period during which the seed signal is monitored;

generating a display signal representative of the actual seed delivery rate;

applying the display signal to an electronic display located in the cab to generate an image on the display representative of the actual seed delivery rate; and modifying a parameter of the seed delivery system which affects the singulating accuracy of the singulating seed meter in response to activation of an operator-activated control input.

18. The method of claim 17, wherein the display signal also represents the target seed delivery rate, and the image also represents the target seed delivery rate.

19. The method of claim 17, wherein the step of generating a seed signal includes monitoring the seeds at the exit to generate the seed signal.

20. A method of maintaining a seed planting rate of a seed planter from a cab of a tractor, the planter including a seed delivery system having a target seed delivery rate controlled by at least one control signal, and a seed channel having an exit through which a number of seeds move toward soil in which the seeds are planted, the method comprising the steps of:

generating a seed signal representative of the number of seeds;

applying the at least one control signal to the seed delivery system to control the target seed delivery rate;

monitoring the seed signal to determine an actual seed delivery rate based upon the number of seeds and a time period during which the seed signal is monitored;

generating a display signal representative of the actual seed delivery rate, including configuring the display signal to generate an image on the display including a bar graph having bars representative of the respective target and actual seed delivery rates;

applying the display signal to an electronic display located in the cab to generate an image on the display representative of the actual seed delivery rate; and modifying a parameter of the seed delivery system which affects the actual seed delivery rate in response to activation of an operator-activated control input.

21. A method of maintaining a seed planting rate of a seed planter from a cab of a tractor, the planter including a seed delivery system having a target seed delivery rate controlled by at least one control signal, and a seed channel having an exit through which a number of seeds move toward soil in which the seeds are planted, the method comprising the steps of:

generating a seed signal representative of the number of seeds;

applying the at least one control signal to the seed delivery system to control the target seed delivery rate;

monitoring the seed signal to determine an actual seed delivery rate based upon the number of seeds and a time period during which the seed signal is monitored;

generating a display signal representative of the actual seed delivery rate, including configuring the display signal to generate an image on an electronic display including a bar graph having at least one bar representative of the actual seed delivery rate and referenced to the target seed delivery rate;

applying the display signal to the display located in the cab to generate an image on the display representative of the actual seed delivery rate; and modifying a parameter of the seed delivery system which affects the actual seed delivery rate in response to activation of an operator-activated control input.

22. A metering system for selectively applying material to the soil of an agricultural field, the system comprising:

a tractor including a cab;

a singulating material meter coupled to the tractor for towing by the tractor and including a material channel having an exit through which an amount of singulated material moves toward the soil;

an electronic sensor supported relative to the meter to generate a material signal representative of the amount of material;

an electronic display supported within the cab to generate images in response to display signals;

at least one operator-activated control supported at the cab; and a processing circuit coupled to the sensor and the display, wherein the processing circuit monitors the material signal, determines an actual material delivery rate based upon the amount of material and a time period during which the material signal is monitored, applies a display signal to the display to generate an image representing the actual material delivery rate, and modifies a parameter of the meter which affects its singulating accuracy on activation of the operator-activated control.

23. The system of claim 22, wherein the channel is defined by a tube through which the material is delivered toward the soil.

24. The system of claim 23, wherein the material is seed and the amount of material is a number of seeds.

25. The system of claim 23, wherein the sensor changes the material signal in response to the passage of amounts of material through the material channel.

* * * * *